(12) United States Patent
Hrdina et al.

(10) Patent No.: US 11,891,331 B2
(45) Date of Patent: Feb. 6, 2024

(54) SYSTEM AND METHOD FOR NITROGEN DOPING OF A GLASS ARTICLE

(71) Applicant: CORNING INCORPORATED, Corning, NY (US)

(72) Inventors: Kenneth Edward Hrdina, Horseheads, NY (US); Ming-Jun Li, Horseheads, NY (US); Haitao Zhang, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 460 days.

(21) Appl. No.: 17/238,618

(22) Filed: Apr. 23, 2021

(65) Prior Publication Data

US 2021/0347690 A1 Nov. 11, 2021

Related U.S. Application Data

(60) Provisional application No. 63/021,965, filed on May 8, 2020.

(51) Int. Cl.
*C03C 25/607* (2018.01)
(52) U.S. Cl.
CPC .................. *C03C 25/607* (2013.01)
(58) Field of Classification Search
CPC .................................................. C03C 25/607
See application file for complete search history.

(56) References Cited

U.S. PATENT DOCUMENTS

| 4,203,744 A | 5/1980 | Schultz et al. |
| 4,402,720 A | 9/1983 | Edahiro et al. |
| 6,768,856 B2 | 7/2004 | Akwani et al. |

(Continued)

FOREIGN PATENT DOCUMENTS

| CN | 108395891 A | 8/2018 |
| DE | 3037491 A1 | 4/1981 |
| EP | 0375548 A1 | 6/1990 |

(Continued)

OTHER PUBLICATIONS

Cooper et al., "Decomposition of NH3 over Quartz Sand at 840-960° C", In Energy & Fuels, vol. 2, 1988, pp. 716-719.

(Continued)

*Primary Examiner* — Cynthia Szewczyk
(74) *Attorney, Agent, or Firm* — Kevin L. Bray

(57) ABSTRACT

A system and method for nitridizing a glass article includes supplying a source of a nitridizing gas including gaseous $NH_3$ to a glass article supported within a furnace assembly and heating the glass article. In some embodiments, the system includes a handle assembly configured to support the glass article within the furnace assembly and a gas supply conduit carried by the handle and configured to supply the nitridizing gas to the glass article. In some embodiments, a method of nitridizing a glass article includes supplying the nitridizing gas such that a residence time of the nitridizing gas at temperatures greater than 500° C. corresponds to a predetermined time period. In some embodiments, a method of nitridizing a glass article includes supplying the nitridizing gas such that the glass articles is exposed to the nitridizing gas within a contact time $t_c$.

20 Claims, 7 Drawing Sheets

(56) References Cited

U.S. PATENT DOCUMENTS

2012/0269711 A1* 10/2012 Sato .................... C03C 25/1061
423/340

FOREIGN PATENT DOCUMENTS

| EP | 0770584 | A1 | | 5/1997 | |
|----|---------|----|----|--------|----|
| GB | 2062615 | A | | 5/1981 | |
| JP | 61-010040 | A | | 1/1986 | |
| JP | 02-064029 | A | | 3/1990 | |
| JP | 2000-169155 | A | | 6/2000 | |
| JP | 2000290027 | A | * | 10/2000 | ......... C03B 19/1453 |
| JP | 2000327348 | A | * | 11/2000 | ......... C03B 19/1453 |
| JP | 5520346 | B2 | * | 6/2014 | ....... C03B 37/01413 |
| JP | 6054239 | B2 | | 12/2016 | |
| JP | 6104738 | B2 | | 3/2017 | |
| JP | 6120531 | B2 | | 4/2017 | |
| WO | WO-2012004398 | A1 | * | 1/2012 | ............. C03B 19/14 |

OTHER PUBLICATIONS

Golant et al., "Nitrogen-doped silica fibers and fiber-based optoelectronic components", In Proceedings of SPIE "Advances in Fiber Optics" (Eugeny M. Dianov ed.), vol. 4083, 2000, pp. 2-11.

Levit et al., "Preparation of silica glass doped with nitrogen by modified chemical vapor deposition", In Glass Physics and Chemistry, vol. 26, 2000, pp. 506-509.

Schroeder et al., "Nitrogen doping of fused silica and silicate glasses: a study of transport and optical properties" In Journal of Non-Crystalline Solids, vol. 102, 1988, pp. 181-195.

International Search Report and Written Opinion of the International Searching Authority; PCT/US2021/028807 dated Jul. 21, 2021, 11 pages; European Patent Office.

* cited by examiner

SYSTEM AND METHOD FOR NITROGEN DOPING OF A GLASS ARTICLE

This application claims priority under 35 USC § 119(e) from U.S. Provisional Patent Application Ser. No. 63/021,965 filed on May 8, 2020 which is incorporated by reference herein in its entirety.

FIELD

The present disclosure generally relates to a system and method for doping a glass article, such as an optical fiber preform, with nitrogen, and more particularly for doping silica glass to form silicon oxynitride glass.

BACKGROUND

Nitridization of glass can affect the characteristics of the glass, such as hardness, elastic modulus, thermal resistance and/or chemical resistance. In the context of silica glass, nitrogen dopants can affect the optical refractive index of the glass. Nitrogen-doped glass can be used in optical waveguides, such as optical fibers. However, fabrication of bulk nitrogen-doped silica glass having the desired doping level can be challenging to achieve.

In view of these considerations, there is a need for systems and methods for nitridizing glass articles, such as optical fiber preforms that can be utilized to form optical fibers.

SUMMARY

According to an embodiment of the present disclosure, a method of nitridizing a glass article is provided. The method includes heating a glass article to a first temperature in a heating chamber, supplying a nitridizing gas comprising $NH_3$ to the heating chamber, wherein the nitridizing gas has an initial concentration of $NH_3$ ($[NH_3]_0$), and heating the nitridizing gas to the first temperature at a first time. The method also includes exposing the glass article to the nitridizing gas within a contact time ($t_c$) of the first time according to formula (IV):

$$t_c = -\left[\ln\left(\frac{[NH_3]_{t_c}}{[NH_3]_0}\right)\right] \Big/ [(5.12 \times 10^6)e^{(-17681/T)}] \quad \text{(IV)}$$

where $[NH_3]_{t_c}$ is a concentration of $NH_3$ in the nitridizing gas at time $t_c$, $[NH_3]_0$ is a concentration of $NH_3$ at the first time, $t_c$ is in seconds, and T is the first temperature (in Kelvin), and wherein a ratio of $[NH_3]_{t_c}:[NH_3]_0$ is at least about 0.0001.

According to another embodiment of the present disclosure, a method of doping a glass article with nitrogen includes, supplying a nitridizing gas to a glass article through an outlet of a gas supply conduit, wherein the nitridizing gas comprises at least gaseous $NH_3$, and wherein a distance between the outlet and the glass article is less than or equal to about 10 cm. The method also includes heating the glass article in a furnace to a first temperature for a predetermined period of time in the presence of the nitridizing gas to form a nitrogen-doped glass article and cooling the nitrogen-doped glass article to a second temperature that is less than the first temperature. A residence time of the nitridizing gas is <3 seconds, wherein the residence time is defined by formula (III):

$$V_t/f \quad \text{(III)}$$

where $V_t$ is an interior volume of the gas supply conduit between a position at which a temperature of the nitridizing gas is >500° C. and the outlet, and where f is the volumetric flow rate of the nitridizing gas in the gas supply conduit.

A method of doping a glass preform with nitrogen includes disposing a glass preform having a first end and a second end in a furnace assembly, wherein the glass preform includes an open channel extending from the first end at least partially through a body of the glass preform toward the second end. The method also includes supplying a nitridizing gas to the open channel of the glass preform through a gas supply pathway having an outlet aligned with an inlet to the open channel, wherein the nitridizing gas comprises at least gaseous $NH_3$, heating the glass preform to a first temperature for a predetermined period of time in the presence of the nitridizing gas to form a nitrogen-doped glass preform, and cooling the nitrogen-doped glass preform to a second temperature that is less than the first temperature. A residence time of the nitridizing gas is <0.6 seconds, wherein the residence time is defined by formula (III):

$$V_t/f \quad \text{(III)}$$

where $V_t$ is an interior volume of the gas supply pathway between a position at which a temperature of the nitridizing gas is >500° C. and the inlet to the open channel, and where f is the volumetric flow rate of the nitridizing gas in the gas supply conduit.

These and other aspects, objects, and features of the present disclosure will be understood and appreciated by those skilled in the art upon studying the following specification, claims, and appended drawings.

DETAILED DESCRIPTION

Figure 1:
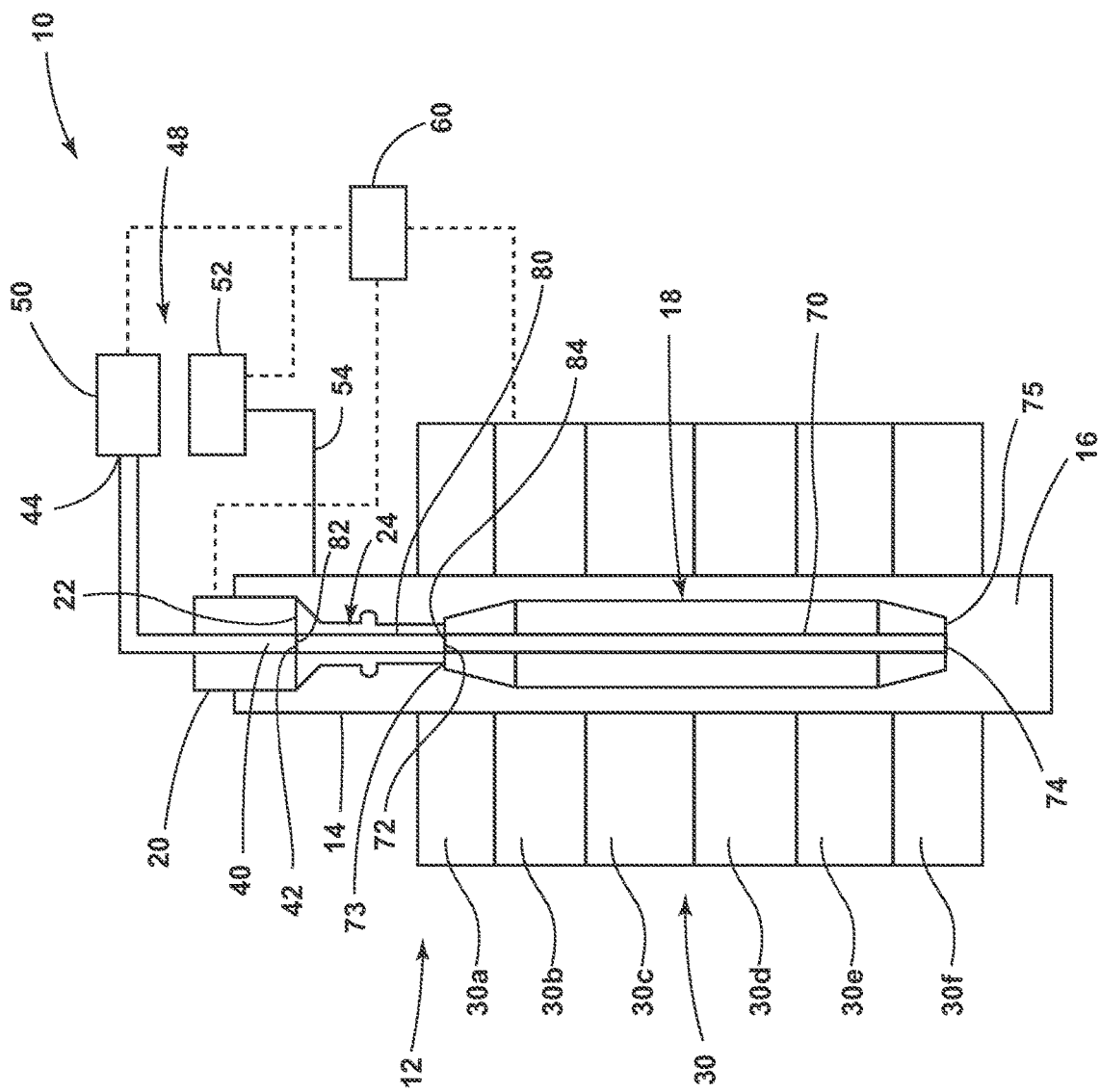
FIG. 1 is a cross-sectional view of a schematic of a nitridizing system for nitrogen doping of a glass preform, according to an embodiment of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "formed from" can mean one or more of comprises, consists essentially of, or consists of. For example, a component that is formed from a particular material can comprise the particular material, consist essentially of the particular material, or consist of the particular material.

"Radial position," "radial distance," when used in reference to the radial coordinate "r" refers to radial position relative to the centerline (r=0) of an optical fiber.

The length dimension "micrometer" may be referred to herein as micron (or microns) or μm.

The "refractive index profile" is the relationship between refractive index or relative refractive index and radial distance r from the core's centerline. For relative refractive index profiles depicted herein as having step boundaries between a core and adjacent cladding region, normal variations in processing conditions may result in step boundaries at the interface of adjacent regions that are not sharp. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (core region and/or any of the cladding regions), it may be expressed in terms of its actual or approximate functional dependence or in terms of an average value applicable to the region. Unless otherwise specified, if the relative refractive index of a region (core region and/or any of the inner and/or outer cladding regions) is expressed as a single value, it is understood that the relative refractive index in the region is constant, or approximately constant, and corresponds to the single value or that the single value represents an average value of a non-constant relative refractive index dependence with radial position in the region. Whether by design or a consequence of normal manufacturing variability, the dependence of relative refractive index on radial position may be sloped, curved, or otherwise non-constant.

The "relative refractive index" or "relative refractive index percent" as used herein with respect to optical fibers and fiber cores of multicore optical fibers is defined according to formula (I):

$$\Delta\% = 100\frac{n^2(r) - n_c^2}{2n^2(r)} \tag{I}$$

where n(r) is the refractive index at the radial distance r from the core's centerline at a wavelength of 1550 nm, unless otherwise specified, and $n_c$ is 1.444, which is the refractive index of undoped silica glass at a wavelength of 1550 nm. As used herein, the relative refractive index is represented by Δ (or "delta") or Δ % (or "delta %) and its values are given in units of "%" or "% Δ", unless otherwise specified. Relative refractive index may also be expressed as Δ(r) or Δ(r) %. When the refractive index of a region is less than the reference index ne, the relative refractive index is negative and can be referred to as a trench. When the refractive index of a region is greater than the reference index $n_c$, the relative refractive index is positive and the region can be said to be raised or to have a positive index.

The average relative refractive index of a region of the optical fiber can be defined according to formula (II):

$$\Delta\% = \frac{\int_{r_{inner}}^{r_{outer}} \Delta(r) dr}{(r_{outer} - r_{inner})} \tag{II}$$

where $r_{inner}$ is the inner radius of the region, $r_{outer}$ is the outer radius of the region, and Δ(r) is the relative refractive index of the region.

As used herein, unless otherwise specified, "residence time" of a gas refers to an amount of time a gas is exposed to a predetermined elevated temperature before reaching a predetermined location. The residence time can be defined according to formula (III):

$$V_t/f \tag{III}$$

where $V_t$ is an interior volume of a pathway the gas traverses between a position at which a temperature of the gas is >500° C. and an end of the pathway, and where f is the volumetric flow rate of the gas through the pathway. The pathway may be defined by one or more integral or discrete sections having the same or different internal diameters. The end of the pathway may correspond to an end of the sample or an end of a particular volume, such as an end of a reaction space or an end of a channel through which the gas can flow.

Unless otherwise specified, the term "gas" can include a single gas or a mixture of one or more gases that may vary or may not vary over time.

As used herein, "nitridization", "nitridizing", "nitrided", and the like refer to a process or gas for incorporating nitrogen as a dopant in a glass article or to a nitrogen-doped glass article.

The present illustrated embodiments generally relate to a system and method for nitridizing a glass article, particularly for nitrogen doping of a silica glass article, such as a silica optical fiber preform or a porous silica body. Accordingly, elements of the present disclosure have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Aspects of the present disclosure generally relate to a system and a method for nitridizing a glass article, particularly a silica glass article. According to some aspects of the present disclosure, a system and method are providing for doping a silica glass article, such as porous silica or a silica glass optical fiber preform, with nitrogen. The system and method described herein include exposing a silica glass article to gaseous ammonia ($NH_3$) under the conditions of the present disclosure to induce incorporation of nitrogen into the silica glass to form silicon oxynitride glass or nitrogen-doped silica. According to some aspects of the present disclosure, the silica glass article is a silica glass preform. The silica glass preform can be doped with nitrogen according to aspects of the present disclosure to form a nitrogen-doped silica glass preform that can then be treated according to a consolidation process to provide a preform suitable for drawing into an optical fiber.

Increased temperatures, such as temperatures greater than 500° C., can facilitate the reaction of the gaseous $NH_3$ with the $SiO_2$ of the silica to form silicon oxynitride glass or doped silica glass. However, as the reaction temperature increases, the rate of decomposition of gaseous $NH_3$ to $N_2$ and $H_2$ can increase, which may decrease the efficiency of the nitridization reaction and limit the nitrogen-doping levels that can be obtained. In some aspects of the present disclosure, the system and method described herein can be configured to supply a nitridizing gas including $NH_3$ to a glass article such that a residence time of the gaseous $NH_3$ in high temperature regions of the system is less than a predetermined time period to facilitate limiting the amount of gaseous $NH_3$ that decomposes prior to reacting with the glass article. For example, in one embodiment, the system and method described herein can be configured to supply a nitridizing gas including $NH_3$ to a glass article such that a residence time of the gaseous $NH_3$ in high temperature regions of the system (e.g., temperatures >500° C.) is low.

Limiting the residence time of the gaseous $NH_3$ in high temperature regions of the system can decrease the amount of gaseous $NH_3$ that decomposes before reacting with the silica or other) glass article, which may allow for an increase in the level of nitrogen doping or incorporation that can be obtained.

Referring to FIG. 1, reference numeral 10 generally designates a nitridizing system configured to incorporate nitrogen into a glass preform to form a nitrogen-doped glass preform. The nitridizing system 10 can include a furnace assembly 12 that includes a muffle 14 defining an interior or heating chamber 16. The interior chamber 16 can be configured to receive a glass preform 18 for treatment according to a treatment process, such as a nitridization process. A handle assembly 20 can be provided for supporting the glass preform 18 within the interior chamber 16 and for inserting and withdrawing the glass preform 18 from the interior chamber 16. The handle assembly 20 includes a first end 22 that is configured to couple with a preform handle 24 of the glass preform 18 for supporting the glass preform 18 within the interior chamber 16. A seal assembly (not shown) can be provided around the muffle 14 and the handle assembly 20 for isolating the interior chamber 16 from an exterior environment around the furnace assembly 12. The nitridizing system 10 also includes a heating system 30 that is configured to heat at least a portion of the interior chamber 16 of the muffle 14 to heat the glass preform 18 during a treatment process according to the present disclosure.

A gas supply conduit 40 can be carried by the handle assembly 20 for supplying a gas to the glass preform 18. According to one embodiment, the gas supply conduit 40 is configured to supply at least gaseous $NH_3$ to the glass preform 18 during a nitridization process. The gas supply conduit 40 includes an outlet 42 configured to supply a gas to the furnace assembly 12 and an inlet 44 that is configured to fluidly couple with a gas supply system 48. The gas supply system 48 can include a nitridizing gas source 50 that includes at least a source of gaseous $NH_3$ for supplying to the furnace assembly 12 through the gas supply conduit 40 for treating the glass preform 18 during a nitridization process. In some embodiments, the nitridizing gas source 50 includes a source of additional gases, such as for example an inert carrier gas, which may be supplied with the gaseous $NH_3$ as part of the nitridizing gas. Optionally, the gas supply system 48 can include a source 52 of one or more additional gases that may be supplied to the furnace assembly 12 through one or more conduits 54 during a nitridization process or other treatment process. The components of the gas supply system 48 can include one or more valves, flow controllers, etc. that can be selectively controlled to supply gases and/or mixtures of gasses to the interior chamber 16 of the furnace assembly 12 during a nitridization process or other treatment process. The gas supply conduits 40 and/or 54 can be made from any suitable material capable of withstanding exposure to the temperatures and gases supplied to the furnace assembly 12 during a treatment process, examples of which include metal, ceramic, stainless steel, and fused silica. In some embodiments, the gas supply conduit 40 is made of stainless steel or fused silica.

According to one embodiment, the gas supply conduit 40 can have an internal diameter configured to limit a residence time of the nitridizing gas supplied through the gas supply conduit 40 to limit a period of time during which the nitridizing gas is exposed to temperatures greater than 500° C., as described in more detail below. In one embodiment, the gas supply conduit 40 can have an internal diameter of from about 0.1 mm to about 5.1 mm. For example, the gas supply conduit 40 can have an internal diameter of from about 0.1 mm to about 5.1 mm, about 0.1 mm to about 4.9 mm, about 0.1 mm to about 4.7 mm, about 0.1 mm to about 4.5 mm, about 0.1 mm to about 4.2 mm, about 0.1 mm to about 4 mm, about 0.1 mm to about 3.8 mm, about 0.1 mm to about 3.5 mm, about 0.1 mm to about 3.2 mm, about 0.1 mm to about 3 mm, about 0.1 mm to about 2.8 mm, about 0.5 mm to about 5.1 mm, about 0.5 mm to about 4.9 mm, about 0.5 mm to about 4.7 mm, about 0.5 mm to about 4.5 mm, about 0.5 mm to about 4.2 mm, about 0.5 mm to about 4.0 mm, about 0.5 mm to about 3.8 mm, about 0.5 mm to about 3.5 mm, about 0.5 mm to about 3.2 mm, about 0.5 mm to about 3.0 mm, about 0.5 mm to about 2.8 mm, about 1 mm to about 5.1 mm, about 1.0 mm to about 4.9 mm, about 1.0 mm to about 4.7 mm, about 1.0 mm to about 4.5 mm, about 1.0 mm to about 4.2 mm, about 1.0 mm to about 4.0 mm, about 1.0 mm to about 3.8 mm, about 1.0 mm to about 3.5 mm, about 1.0 mm to about 3.2 mm, about 1.0 mm to about 3.0 mm, about 1.0 mm to about 2.8 mm, about 2.5 mm to about 5.1 mm, about 2.5 mm to about 4.9 mm, about 2.5 mm to about 4.7 mm, about 2.5 mm to about 4.5 mm, about 2.5 mm to about 4.2 mm, about 2.5 mm to about 4.0 mm, about 2.5 mm to about 3.8 mm, about 2.5 mm to about 3.5 mm, about 2.5 mm to about 3.2 mm, about 2.5 mm to about 3.0 mm, about 2.5 mm to about 2.8 mm, about 3.0 mm to about 5.1 mm, about 3.0 mm to about 4.9 mm, about 3.0 mm to about 4.7 mm, about 3.0 mm to about 4.5 mm, about 3.0 mm to about 4.2 mm, about 3.0 mm to about 4.0 mm, about 3.0 mm to about 3.8 mm, about 3.0 mm to about 3.5 mm, about 3.5 mm to about 5.1 mm, about 3.5 mm to about 4.9 mm, about 3.5 mm to about 4.7 mm, about 3.5 mm to about 4.5 mm, about 3.5 mm to about 4.2 mm, about 3.5 mm to about 4.0 mm, about 4.0 mm to about 5.1 mm, about 4.0 mm to about 4.9 mm, about 4.0 mm to about 4.7 mm, or about 4.0 mm to about 4.5 mm. The internal diameter of the gas supply conduit 40 may be consistent along the length of the supply conduit 40 or vary along one or more portions of the length of the supply conduit 40.

The heating system 30 can include one or more heating elements disposed adjacent to the muffle 14 for heating the environment within the interior chamber 16. In one example, the heating system 30 can include one or more resistive heating elements disposed along a length of at least a portion of the interior chamber 16. Other suitable types of heating elements can also be used. According to one embodiment, as illustrated in FIG. 1, the heating system 30 can include multiple heating zones 30a-30f that can be individually controlled to provide a desired temperature profile within the interior chamber 16. According to one embodiment, the multiple heating zones 30a-30f can be individually controlled to provide a temperature gradient along at least a portion of the length of the glass preform 18. Optionally, the furnace assembly 12 can include one or more temperature sensors, such as a thermocouple (not shown), that are configured to measure a temperature of the one or more of the heating zones 30a-30f. In one example, the heating zones 30a-30f may be defined by multiple, independently controlled heating elements. In another example, the heating zones 30a-30f may correspond to discrete regions of a single heating element. While 6 heating zones are illustrated, the heating system 30 may include more or fewer heating zones.

In some embodiments, the nitridization system can include a control unit 60 that can be operably coupled with one or more components of the nitridizing system 10 for controlling said components during a nitridization process or other treatment process. For example, the control unit 60 can be operably coupled with one or more components of the gas supply system 48, such as the valves and/or flow controllers, for controlling these components according to a treatment process, such as a nitridization process. In another example, the control unit 60 can be operably coupled with one or more components of the heating system 30, such as the heating zones 30a-30f, heating elements, and/or temperature sensors, for controlling these components during a treatment process, such as a nitridization process. In another example, the control unit 60 can be operably coupled with a drive assembly of the handle assembly 20 for selectively moving the glass preform 18 in the X, Y, and/or Z-directions with respect to the interior chamber 16. The control unit 60 can be any suitable control system or combination of systems capable of receiving input and outputting control signals to a particular component based on the received input. While only a single control unit 60 is illustrated, it is understood that multiple control units can be used to control one or more individual components, which may be operated independently or as part of a single control system.

The furnace assembly 12 is configured to provide a heated environment within the interior chamber 16 for treating the glass preform 18 according to a nitridization process or other treatment process. The furnace assembly 12 is also configured to provide a sealed environment for selectively isolating the interior chamber 16 from the exterior environment to inhibit mixing of gases present within the interior chamber 16 with gases in the exterior environment during a treatment process. In some embodiments, the furnace assembly 12 can be similar to those utilized in forming a glass preform, such as a furnace assembly used in a conventional outside vapor deposition (OVD) process, or a furnace assembly used in a consolidation process. In some embodiments, the furnace assembly 12 is utilized to implement a nitridization process according to the present disclosure in addition to other processes, such as drying, sintering, and/or consolidation.

In one embodiment, the preform handle 24 may be formed with the glass preform 18 such that the preform handle 24 is integrally formed with the glass preform 18. In another embodiment, the preform handle 24 and the glass preform 18 may be formed separately and the preform handle 24 may be coupled with the glass preform 18 after the glass preform 18 is formed. The preform handle 24 can have any suitable shape and dimensions for coupling with the glass preform 18 on a first end and for coupling with the handle assembly 20 on a second end for suspending the glass preform 18 within the furnace assembly 12.

The glass preform 18 can be formed according to any suitable process for providing a glass preform having the desired characteristics for subsequent doping with nitrogen according to the present disclosure. For example, the glass preform 18 can be made using any suitable conventional preform manufacturing technique, such as outside vapor deposition (OVD), modified chemical vapor deposition (MCVD), or plasma activated chemical vapor deposition (PCVD). The glass preform 18 can be an optical fiber core preform or an optical fiber cladding preform suitable for use in the formation of single mode and/or multimode optical fibers. The glass preform 18 may be undoped glass, such as undoped silica glass, or may be a doped glass, such as doped silica glass, prior to treatment in the nitridizing system 10 according to a nitridization process of the present disclosure. According to one embodiment, the glass preform 18 may be a silica glass preform that is doped with at least one of $GeO_2$, $Al_2O_3$, $P_2O_5$, Br, Cl, and/or F according to any suitable doping process, prior to a nitridization process to further dope the silica glass with nitrogen to form a nitrogen co-doped glass preform.

Examples of suitable precursors for forming a silica preform include $SiCl_4$ and organosilicon compounds. Organosilicon compounds are silicon compounds that include carbon, and optionally oxygen and/or hydrogen. Examples of suitable organosilicon compounds include octamethylcyclotetrasiloxane (OMCTS), silicon alkoxides $(Si(OR)_4)$, organosilanes $(SiR_4)$, and $Si(OR)_xR_{4-x}$, where R is a carbon-containing organic group or hydrogen and where R may be the same or different at each occurrence, and wherein at least one R is a carbon-containing organic group. Examples of suitable precursors for chlorine doping include $Cl_2$, $SiCl_4$, $Si_2Cl_6$, $Si_2OCl_6$, $SiCl_3H$, and $CCl_4$. Examples of suitable precursors for fluorine doping include $F_2$, $CF_4$, and $SiF_4$. Regions of constant refractive index may be formed by not doping or by doping at a uniform concentration over the thickness of the region. Regions of variable refractive index may be formed through non-uniform spatial distributions of dopants over the thickness of a region and/or through incorporation of different dopants in different regions. The OVD, MCVD, PCVD and other techniques for generating silica soot permit fine control of dopant concentration through layer-by-layer deposition with variable flow rate delivery of dopant precursors.

According to one embodiment, the glass preform 18 is formed in an outside vapor deposition (OVD) process. In one example, the OVD process to form the glass preform 18 can include deposition of silica soot or doped silica soot onto a substrate configured to accept the soot, such as a bait rod. The bait rod may be made of any suitable material and have a shape and dimensions suitable for forming a silica soot preform. For example, the bait rod may be made of a ceramic material. Examples of suitable cross-sectional shapes for the bait rod include circular, rectangular, or any other polygonal cross-sectional shape. In some embodiments, the glass preform 18 may be formed according to other processes suitable for forming a preform, examples of which include modified chemical vapor deposition and physical vapor deposition.

After deposition of the soot, the bait rod may be subsequently be removed from the glass preform 18, resulting in a hollow center or open channel 70 extending through a body of the glass preform 18. The channel 70 can extend through the body of the glass preform 18 between a channel inlet 72 disposed at a first end 73 of the glass preform 18 and a channel end 74 disposed at a second end 75 of the glass preform 18. In some embodiments, the channel 70 extends through the second end 75 of the glass preform 18 such that the channel end 74 is open and corresponds to an outlet of the channel 70 formed in the second end 75. In some embodiments, the channel 70 may not extend completely through a length of the body of the glass preform 18 such that the channel end 74 is closed. The channel 70 may generally be disposed along a centerline of the glass preform 18, although the radial position of the channel 70 with respect to the body of the glass preform 18 may be offset from the centerline. It is also understood that more than one bait rod may be used, resulting in more than one channel extending into the body of the glass preform 18.

The glass preform 18 can have any shape, dimensions, or other characteristics, as desired, based at least in part on the desired end product to be formed from the glass preform 18 and/or based on a desired level of nitrogen doping to achieve in a subsequent nitridization process. In some embodiments, the glass preform 18 can have an outer diameter of from about 20 mm to about 200 mm. A diameter of the channel inlet 72 may be about 20 mm or less, about 10 mm or less, about 5 mm or less, about 4 mm or less, or about 3 mm or less. The channel 70 may have the about the same diameter as the channel inlet 72 and/or a different diameter along at least a portion of a length of the channel 70.

The glass article can be subjected to a nitridization process in a consolidated state or a porous state. A consolidated state is a fully densified (i.e., closed pore) state. When the glass article is consolidated, the nitridization reaction occurs primarily at the surface of the article to form a nitrogen-doped surface layer. When the glass article is in a porous state, the nitridizing gas enters the pores to provide nitrogen doping within and/or throughout the glass article. A nitrogen-doped porous glass article can be consolidated to form a consolidated glass article with nitrogen doping. In one embodiment, the glass article is a porous glass preform. The glass of the glass article is preferably formed from silica.

In some embodiments, the glass preform comprises silica in a porous state and has a density of from about 0.3 $g/cm^3$ to about 1.8 $g/cm^3$. For example, the glass preform can have a density of from about 0.3 $g/cm^3$ to about 1.8 $g/cm^3$, about 0.3 $g/cm^3$ to about 1.6 $g/cm^3$, about 0.3 $g/cm^3$ to about 1.4 $g/cm^3$, about 0.3 $g/cm^3$ to about 1.2 $g/cm^3$, about 0.3 $g/cm^3$ to about 1.1 $g/cm^3$, about 0.3 $g/cm^3$ to about 0.9 $g/cm^3$, about 0.3 $g/cm^3$ to about 0.7 $g/cm^3$, about 0.3 $g/cm^3$ to about 0.5 $g/cm^3$, about 0.5 $g/cm^3$ to about 1.8 $g/cm^3$, about 0.5 $g/cm^3$ to about 1.6 $g/cm^3$, about 0.5 $g/cm^3$ to about 1.4 $g/cm^3$, about 0.5 $g/cm^3$ to about 1.2 $g/cm^3$, about 0.5 $g/cm^3$ to about 1.1 $g/cm^3$, about 0.5 $g/cm^3$ to about 0.9 $g/cm^3$, about 0.5 $g/cm^3$ to about 0.7 $g/cm^3$, about 0.7 $g/cm^3$ to about 1.8 $g/cm^3$, about 0.7 $g/cm^3$ to about 1.6 $g/cm^3$, about 0.7 $g/cm^3$ to about 1.4 $g/cm^3$, about 0.7 $g/cm^3$ to about 1.2 $g/cm^3$, about 0.7 $g/cm^3$ to about 1.1 $g/cm^3$, about 0.7 $g/cm^3$ to about 0.9 $g/cm^3$, about 0.9 $g/cm^3$ to about 1.8 $g/cm^3$, about 0.9 $g/cm^3$ to about 1.6 $g/cm^3$, about 0.9 $g/cm^3$ to about 1.4 $g/cm^3$, about 0.9 $g/cm^3$ to about 1.2 $g/cm^3$, about 0.9 $g/cm^3$ to about 1.1 $g/cm^3$, about 1.1 $g/cm^3$ to about 1.8 $g/cm^3$, about 1.1 $g/cm^3$ to about 1.6 $g/cm^3$, about 1.1 $g/cm^3$ to about 1.4 $g/cm^3$, or about 1.1 $g/cm^3$ to about 1.2 $g/cm^3$. In some examples, the glass preform 18 can have a porosity of about 40% to about 70%, and in some examples the porosity of the glass preform 18 may be about 60%. In some examples, the glass preform 18 can have pores having an average pore diameter of about 100 nm to about 300 nm.

According to one embodiment, the preform handle 24 includes a preform handle channel 80 that extends through a length of the body of the preform handle. In some examples, the preform handle channel 80 can have a length of from about 8 cm to about 20 cm. For example, the preform handle channel 80 can have a length of from about 8 cm to about 20 cm, about 8 cm to about 18 cm, about 8 cm to about 16 cm, about 8 cm to about 15 cm, about 8 cm to about 14 cm, about 8 cm to about 12 cm, about 8 cm to about 10 cm, about 10 cm to about 20 cm, about 10 cm to about 18 cm, about 10 cm to about 16 cm, about 10 cm to about 15 cm, about 10 cm to about 14 cm, about 10 cm to about 12 cm, about 12 cm to about 20 cm, about 12 cm to about 18 cm, about 12 cm to about 16 cm, about 12 cm to about 15 cm, about 12 cm to about 14 cm, about 14 cm to about 20 cm, about 14 cm to about 18 cm, about 14 cm to about 16 cm, about 16 cm to about 20 cm, about 16 cm to about 18 cm, about 15 cm to about 20 cm, or about 15 cm to about 18 cm. In some examples, the preform handle channel 80 can have an internal diameter of from about 1.0 cm to about 2.0 cm. For example, the preform handle channel 80 can have an internal diameter of from about 1.0 cm to about 2.0 cm, about 1.2 cm to about 2.0 cm, about 1.4 cm to about 2.0 cm, about 1.5 cm to about 2.0 cm, about 1.7 cm to about 2.0 cm, about 1.0 cm to about 1.7 cm, about 1.2 cm to about 1.7 cm, about 1.4 cm to about 1.7 cm, about 1.5 cm to about 1.7 cm, about 1.0 cm to about 1.5 cm, about 1.2 cm to about 1.5 cm, about 1.4 cm to about 1.5 cm, about 1.0 cm to about 1.4 cm, or about 1.2 cm to about 1.4 cm. In one embodiment, the preform handle channel 80 has a length of from about 10 cm to about 15 cm and an internal diameter of about 1.5 cm.

The gas supply conduit 40 and the preform handle 24 can be configured such that when the preform handle 24 is coupled with the handle assembly 20 for supporting the glass preform 18 within the furnace assembly 12, the outlet 42 of the gas supply conduit 40 is generally aligned with a preform handle inlet 82 of the preform handle channel 80 for supplying gas to the preform handle channel 80. In this embodiment, the preform handle 24 can be coupled with the glass preform 18 such that a preform handle outlet 84 of the preform handle channel 80 is generally aligned with the channel inlet 72 of the glass preform channel 70 such that gas can be supplied through the gas supply conduit 40, exit the outlet 42 of the gas supply conduit 40, enter the preform handle channel 80 through the preform handle inlet 82, flow through the preform handle channel 80 to the preform handle outlet 84, enter the channel 70 through the channel inlet 72, and flow through the length of the channel 70. The gas supply conduit 40 and the preform handle channel 80 can together at least partially define a gas supply pathway to the glass preform 18. In this manner, the gas supply conduit 40 and the preform handle 24 can be configured to provide the nitridizing gas to an interior of the body of the glass preform 18 through the channel 70.

According to another embodiment, the gas supply conduit 40 can be configured such that the outlet 42 is generally aligned with an exterior of the preform handle 24 such that gas exiting the gas supply conduit 40 through the outlet 42 flows over at least a portion of an exterior of the body of the glass preform 18.

Figure 2:
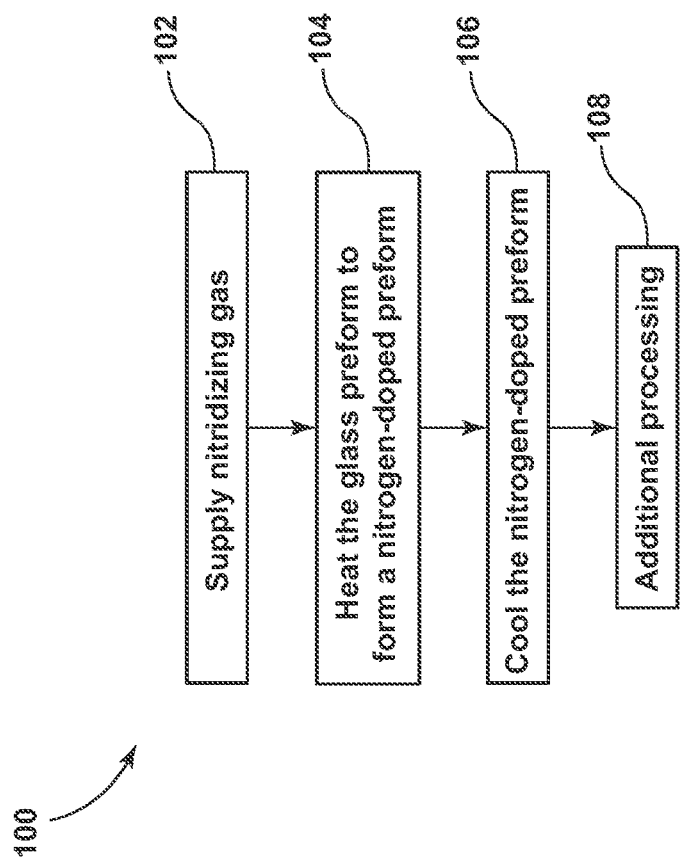
FIG. 2 is a flowchart of a method for nitrogen doping of a glass article, according to an embodiment of the present disclosure.

FIG. 2 illustrates a flow chart of a method 100 for nitrogen doping of a glass article in a nitridization process according to an embodiment of the present disclosure. While the nitrogen doping method 100 of FIG. 2 is discussed in the context of the nitridization system 10 of FIG. 1, the nitrogen doping method 100 may also be implemented in different systems. The nitrogen doping method 100 includes a step 102 of supplying a nitridizing gas to the glass preform 18 through the outlet 42 of the gas supply conduit 40. The nitridizing gas source 50 can include at least a source of gaseous $NH_3$, and optionally a source of at least one inert carrier gas, to form a nitridizing gas. Non-limiting examples of inert carrier gasses include gaseous $N_2$, Ar, and He. At step 104, the heating system 30 can be operated to heat the interior chamber 16, and thereby heat the glass preform 18, according to a predetermined temperature profile that includes heating to at least a first temperature to facilitate a reaction between the gaseous $NH_3$ in the nitridizing gas supplied through the outlet 42 and the $SiO_2$ in the glass preform 18 to form silicon oxynitride, i.e. nitrogen-doped silica, in the glass preform 18. The steps 102 and 104 occur at least partially concomitantly such that the glass preform 18 is exposed to sufficient gaseous $NH_3$ at sufficient temperatures to provide a nitrogen-doped glass preform having a desired level of nitrogen doping. In this manner, the steps 102 and 104 provide an environment suitable to induce a nitridization reaction (also referred to as a nitrogen doping reaction) between the $SiO_2$ in the glass preform 18 and the supplied gaseous $NH_3$ to form silicon oxynitride.

At step 106, the nitrogen-doped glass preform is cooled to a second temperature that is lower than the first temperature. Step 106 may include active cooling, such as by supplying a gas at a lower temperature to the interior chamber 16, and/or passive cooling in which the sample is allowed to cool in the absence of the application of thermal energy. At step 108, following cooling of the nitrogen-doped glass preform to the second temperature, the nitrogen-doped glass preform may be treated to one or more additional treatment processes, examples of which include a drying process and a consolidation process.

In some embodiments, prior to the step 102 of supplying the nitridizing gas, the glass preform 18 can be heated to a predetermined temperature to prepare the glass preform 18 for the nitridization reaction. In one example, the glass preform 18 can be heated to a predetermined temperature for a predetermined period of time to remove water from the glass preform. For example, the glass preform 18 can be heated to a temperature of at least about 400° C. in a gaseous $N_2$ environment (or other inert gas). The predetermined period of time may vary based on variables such as the characteristics of the glass preform and the temperature, but may be from about 10 hours to about 18 hours or more or less, as needed.

According to one embodiment, the nitridizing gas supplied at step 102 can include a mixture of gaseous $NH_3$ and an inert carrier gas, such as gaseous $N_2$. A concentration of supplied gaseous $NH_3$ and carrier gas and a volumetric flow rate of the nitridizing gas may be selected to provide a desired level of nitrogen doping in the glass preform 18. While the exemplary embodiments of the present disclosure are discussed in the context of gaseous $N_2$ as the inert carrier gas, the inert carrier gas may be any other suitable inert carrier gas, such as gaseous Ar or He, or combinations of any one or more carrier gases.

In one embodiment, the nitridizing gas can include a concentration of gaseous $NH_3$ ($NH_3/(NH_3+$carrier gas)) of from about 3% by volume (3 vol %) to about 100% by volume (100 vol %). For example, the concentration of $NH_3$ ($NH_3/(NH_3+$carrier gas)) can be from about 3 vol % to about 100 vol %, about 3 vol % to about 90 vol %, about 3 vol % to about 80 vol %, about 3 vol % to about 70 vol %, about 3 vol % to about 60 vol %, about 3 vol % to about 50 vol %, about 3 vol % to about 40 vol %, about 3 vol % to about 30 vol %, about 3 vol % to about 20 vol %, about 3 vol % to about 10 vol %, about 3 vol % to about 7 vol %, about 3 vol % to about 5 vol %, about 5 vol % to about 100 vol %, about 5 vol % to about 90 vol %, about 5 vol % to about 80 vol %, about 5 vol % to about 70 vol %, about 5 vol % to about 60 vol %, about 5 vol % to about 50 vol %, about 5 vol % to about 40 vol %, about 5 vol % to about 30 vol %, about 5 vol % to about 20 vol %, about 5 vol % to about 10 vol %, about 5 vol % to about 7 vol %, about 7 vol % to about 100 vol % about 7 vol % to about 90 vol %, about 7 vol % to about 80 vol %, about 7 vol % to about 70 vol %, about 7 vol % to about 60 vol %, about 7 vol % to about 50 vol %, about 7 vol % to about 40 vol %, about 7 vol % to about 30 vol %, about 7 vol % to about 20 vol %, or about 7 vol % to about 10 vol %. In some examples, the concentration of $NH_3$ ($NH_3/(NH_3+$carrier gas)) can be 3 vol %, about 5 vol %, about 7 vol %, about 10 vol %, about 20 vol %, about 30 vol %, about 40 vol %, about 50 vol %, about 60 vol %, about 70 vol %, about 80 vol %, about 90 vol %, about 100 vol %, or any concentration between these values. In one example, the nitridizing gas includes 3 vol % $NH_3$ and 97 vol % carrier gas, such as $N_2$. In another example, the nitridizing gas includes 5 vol % $NH_3$ and 95 vol % carrier gas. The concentration of $NH_3$ supplied at step 102 during the nitridizing reaction may be constant or may vary with time. For example, the control unit 60 can be configured to control the nitridizing gas source 50 according to a gas concentration profile to provide a desired amount of gaseous NH$_3$ and a desired ratio of NH$_3$:carrier gas.

The flow rate of the nitridizing gas may be constant or may vary with time during the supplying step 102 to facilitate the nitridization process. In some embodiments, the flow rate or average flow rate of the nitridizing gas is from about 1 liter per minute (L/min.) to about 2.5 L/min. For example, the flow rate of the nitridizing gas can be from about 1 L/min. to about 2.5 L/min., about 1 L/min. to about 2 L/min., about 1 L/min. to about 1.5 L/min., about 1.25 L/min. to about 2.5 L/min., about 1.25 L/min. to about 2 L/min., about 1.25 L/min. to about 1.5 L/min., about 1.5 L/min. to about 2.5 L/min., about 1.5 L/min. to about 2 L/min., or about 2 L/min. to about 2.5 L/min.

According to one embodiment, the gas supply conduit 40 may be configured to supply the nitridizing gas at step 102 to an interior of the glass preform 18 by supplying the nitridizing gas into the channel 70. In this embodiment, the gas supply conduit 40 and preform handle 24 can be configured such that when the glass preform 18 is supported by the handle assembly 20, the outlet 42 of the gas supply conduit 40 is generally aligned with the preform handle channel 80, which is generally aligned with the preform channel 70, such that the gas supply conduit 40 and the preform handle channel 80 together at least partially define a gas supply pathway for supplying a gas to the preform channel 70. In this manner, gas exiting the gas supply conduit 40 through the outlet 42 passes through the preform channel 80 and through the channel inlet 72 and into the channel 70. The gaseous NH$_3$ can diffuse into the portions of the body of the glass preform 18 defining the channel 70 and react with the SiO$_2$ to form silicon oxynitride in the glass preform 18. The gaseous NH$_3$ can also diffuse into the pores of glass preform 18 to achieve nitrogen doping of the glass preform 18 away from the channel 70 into and throughout glass preform 18.

According to another embodiment, the gas supply conduit can be configured to supply the nitridizing gas at step 102 to an exterior of the glass preform 18 by aligning the outlet 42 with an exterior portion of the body of the glass preform 18. The gaseous NH$_3$ can diffuse into the exposed exterior portions of the body and react with the SiO$_2$ to form silicon oxynitride in the glass preform 18.

According to one embodiment, the heating of the glass preform 18 at step 104 may include heating the glass preform 18 to a predetermined first temperature according to a predetermined temperature profile in order to provide the desired level of nitrogen doping. The heating parameters at step 104 may be selected together with the gas supply parameters of step 102 to provide the desired level of nitrogen doping in the glass perform 18. In one embodiment, the glass preform 18 can be heated to a temperature in a range of from about 600° C. to about 1300° C. to facilitate the formation of silicon oxynitride or doping of nitrogen in the glass preform 18. For example, the glass preform 18 can be heated to a temperature in a range of from about 600° C. to about 1300° C., about 600° C. to about 1200° C., about 600° C. to about 1100° C., about 600° C. to about 1000° C., about 600° C. to about 900° C., about 600° C. to about 800° C., 800° C. to about 1300° C., about 800° C. to about 1200° C., about 800° C. to about 1100° C., about 800° C. to about 1000° C., about 800° C. to about 900° C., 900° C. to about 1300° C., about 900° C. to about 1200° C., about 900° C. to about 1100° C., about 900° C. to about 1000° C., 1000° C. to about 1300° C., about 1000° C. to about 1200° C., or about 1000° C. to about 1100° C. The glass preform 18 may be heated to a predetermined temperature and the predetermined temperature may be maintained for a predetermined period of time to provide the desired level of nitrogen doping or incorporation in the glass preform 18. The predetermined period of time for heating the glass preform 18 may be based at least in part on a desired level of nitrogen doping or incorporation, the predetermined temperature, and the parameters (e.g., temperature, flow rate) of the nitridizing gas supplied according to step 102.

According to one embodiment, the glass preform 18 may be heated to a single temperature along the length of the glass preform 18. According to another embodiment, the glass preform 18 may be heated according to a temperature gradient such that a temperature of the glass preform 18 varies along the length of the glass preform 18. For example, as illustrated in FIG. 1, the heating system 30 can include multiple heating zones 30a-30f. One or more of the heating zones 30a-30f may be controlled independently of the other heating zones to provide a temperature gradient along at least a portion of the length of the glass preform 18. In one embodiment, the heating zones 30a-30f may be controlled such that the temperature along the length of the glass preform 18 increases from the channel inlet 72 toward the opposite end of the glass preform 18. For example, the heating zones 30a-30f may be controlled such that the temperature increases from about 600° C. in heating zone 30a to about 1300° C. in heating zone 30f. In another example, the heating zones 30a-30f may be controlled such that the temperature increases from about 900° C. in heating zone 30a to about 1100° C. in heating zone 30f. According to some embodiments, the heating zones 30a-30f may be controlled such that the temperature increases from about 600° C., about 700° C., about 800° C., about 900° C., or about 1000° C. in heating zone 30a to about 900° C., about 1000° C., about 1100° C., about 1200° C., or about 1300° C. in heating zone 30f.

Figure 3:
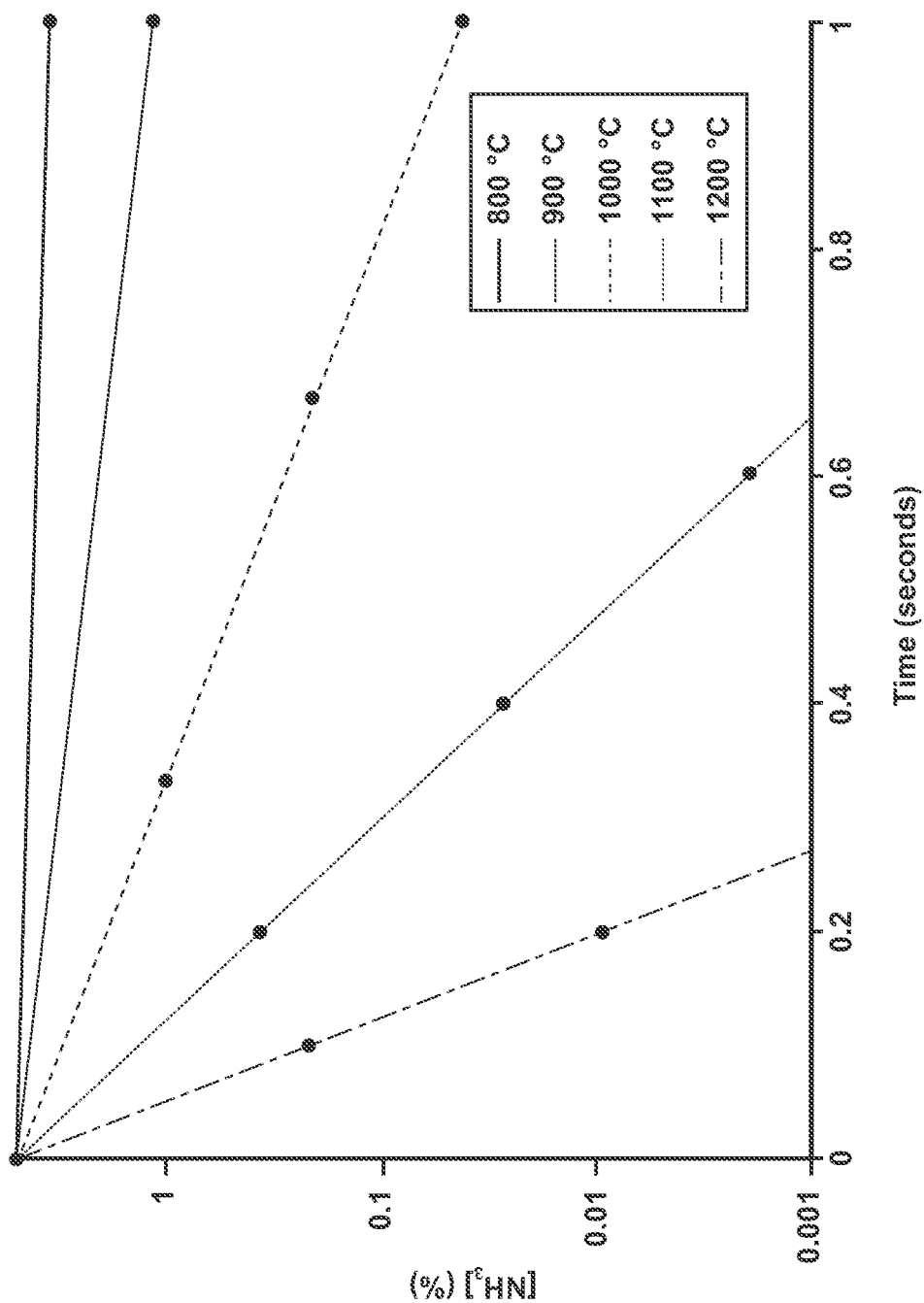
FIG. 3 is a plot of concentration of undecomposed $NH_3$ in gaseous $NH_3$ as a function of time at the temperatures indicated, according to an embodiment of the present disclosure.

Referring to FIG. 3, a plot of the concentration of undecomposed (molecular) NH$_3$ in gaseous NH$_3$ as a function of time at different temperatures for a gas mixture of 5 vol % NH$_3$/95 vol % N$_2$ is illustrated. Without wishing to be limited by any theory, the reaction of SiO$_2$ with gaseous NH$_3$ to form silicon oxynitride (i.e., nitrogen-doped silica) can be affected by temperature. As the temperature increases, the rate of reaction of SiO$_2$ with gaseous NH$_3$ to form silicon oxynitride may also increase. High temperatures, such as temperatures within a range of from about 600° C. to about 1300° C., can provide a reaction rate for using gaseous NH$_3$ to form nitrogen-doped glass articles, such as nitrogen-doped silica glass preforms, which is suitable for forming optical fibers. However, as illustrated in FIG. 3, as the temperature increases, a rate of decomposition of gaseous NH$_3$ can also increase such that the fraction of NH$_3$ in gaseous NH$_3$ decreases with time as molecular NH$_3$ thermally decomposes to N$_2$ and H$_2$. For example, as illustrated in FIG. 3, in some cases, more than 94% of gaseous NH$_3$ decomposes in 0.6 seconds at a temperature of 1000° C. The example of FIG. 3 illustrates that after 0.6 seconds, the concentration of NH$_3$ in a 5 vol % NH$_{3/95}$ vol % N$_2$ gas mixture is reduced to about 0.3 vol %, i.e., about 94 vol % of the gaseous NH$_3$ has decomposed. Thus, while high temperatures can facilitate the nitridization reaction of NH$_3$ with glass to produce a nitrogen-doped glass article, the high temperatures can also result in an increase in the decomposition rate of gaseous NH$_3$, which can decrease the efficiency of the nitridization reaction, and thus may result in lower doping levels of nitrogen in the glass article than desired.

Controlling the heating system 30 to heat the glass preform 18 according to a temperature gradient, as described above, can facilitate providing a more uniform level of nitrogen doping along the length of the glass preform 18 by heating those portions of the glass preform 18 closest to the channel inlet 72 to a lower temperature than those portions of the glass preform 18 furthest from the channel inlet 72.

According to one embodiment of the present disclosure, the nitrogen doping method 100 can include limiting a residence time of the gaseous $NH_3$ at temperatures greater than 500° C. during the nitridization reaction in steps 102 and 104. In one embodiment, the flow rate of the nitridizing gas supplied in step 102 of the method 100 and the configuration of the nitridization system 10 of FIG. 1 can be selected such that a residence time of the gaseous $NH_3$ at temperatures greater than about 500° C. during the nitridization reaction in steps 102 and 104 is less than 3.0 seconds. In some examples, the flow rate of the nitridizing gas supplied in step 102 of the method 100 and the configuration of the nitridization system 10 of FIG. 1 can be selected such that a residence time of the gaseous $NH_3$ at temperatures greater than 500° C. is less than 3.0 seconds, less than 2.75 seconds, less than 2.5 seconds, less than 2.25 seconds, less than 2.0 seconds, less than 1.75 seconds, less than 1.5 seconds, less than 1.0 seconds, less than 0.75 seconds, less than 0.6 seconds, less than 0.5 seconds, less than 0.4 seconds, less than 0.3 seconds, less than 0.2 seconds, or less than 0.1 seconds.

As used herein, residence time can be defined by formula (III):

$$V_t/f \quad \text{(III)}$$

where $V_t$ is an interior volume of the gas supply pathway between a position at which a temperature of the nitridizing gas is greater than 500° C. and an end of the gas supply pathway, and where f is the volumetric flow rate of the nitridizing gas through the gas supply pathway. With respect to the exemplary embodiment of a nitridizing system 10 of FIG. 1, the interior volume $V_t$ can be affected by a temperature of profile within the furnace assembly 12, an internal diameter of the gas supply pathway, and/or a distance the nitridizing gas travels at temperatures greater than 500° C. before reaching the gas supply pathway outlet. The residence time of the gaseous $NH_3$ at temperatures greater than 500° C. can affect a concentration of gaseous $NH_3$ that is available for reaction with the $SiO_2$ of the glass preform 18 and thus controlling the residence time of the gaseous $NH_3$ can facilitate doping the glass preform 18 with a desired level of nitrogen by permitting reaction of gaseous $NH_3$ with the glass article before appreciable decomposition of $NH_3$ has occurred. According to one aspect of the present disclosure, the temperature inside the interior chamber 16 can be assumed to be uniform and the glass preform 18 can be heated within the interior chamber 16 for a sufficient period of time that a temperature of the glass preform 18 can be considered to be uniform. In one aspect, the configuration of the heating system 30 and the temperature inside the interior chamber 16 can be used to estimate a point along the gas supply pathway at which the nitridizing gas is heated to 500° C. While there may be some variability in the temperature of the nitridizing gas along portions of the gas supply pathway upstream of the glass preform 18, because this portion of the gas supply pathway accounts for a small portion of the overall volume of the gas supply pathway, the temperature gradient within the portions of the gas supply pathway upstream of the glass preform 18 can be ignored. For example, with respect to the embodiment of FIG. 1, the point along the gas supply pathway at which the nitridizing gas is heated to 500° C. is approximately 20 cm upstream of the first heating zone 30a, which generally corresponds to the junction between the gas supply conduit outlet 42 and the preform handle inlet 82.

According to one embodiment, when the nitridizing system 10 is configured to supply the nitridizing gas to the open channel 70 of the glass preform 18 through the open channel 80 of the preform handle 24, the end of the gas supply pathway for the purpose of calculating residence time corresponds to the channel end 74. When the open channel 70 extends through the second end 75 of the glass preform 18 such that the channel end 74 corresponds to an outlet of the channel 70, the gas supply pathway extends from the preform handle inlet 82 to the second end 75 of the glass preform 18. When the open channel 70 does not extend through the second end 75 of the glass preform 18, the gas supply pathway is considered as extending from the preform handle inlet 82 to the channel end 74.

According to another embodiment, the end of the gas supply pathway may correspond to the outlet 42 of the gas supply conduit 40. In configurations in which the nitridizing gas is not supplied through the open channel 80 of the preform handle 24, the outlet 42 of the gas supply conduit 40 corresponds to the outlet of the gas supply pathway for calculating the residence time of the gaseous $NH_3$. For example, when the nitridizing gas is supplied to an exterior of the glass preform 18 through the outlet 42, the outlet 42 corresponds to the outlet of the gas supply pathway. In another example, when the glass preform 18, or other glass article, is supported within the interior chamber 16 without the use of the preform handle 24, the outlet of the gas supply pathway corresponds to the outlet 42 of the gas supply conduit 40.

According to another aspect of the present disclosure, the step 102 can include supplying a nitridizing gas including $NH_3$ to the interior chamber 16 and exposing the glass preform 18 to the nitridizing gas within a contact time ($t_c$) of the gas being heated to a temperature T, where the contact time ($t_c$) relative to an initial time t=0 sec is given by formula (IV):

$$t_c = -\left[\ln\left(\frac{[NH_3]_{t_c}}{[NH_3]_0}\right)\right] / [(5.12 \times 10^6) e^{(-17681/T)}] \quad \text{(IV)}$$

where the initial time t=0 sec is the time at which the temperature of $NH_3$ reaches T, $[NH_3]_0$ is an initial concentration (vol %) of $NH_3$ in the nitridizing gas at the initial time t=0 sec, $[NH_3]_{t_c}$ is a concentration (vol %) of $NH_3$ in the nitridizing gas at contact time $t_c$, and T is the temperature of the $NH_3$ gas at contact time $t_c$. For the purposes of the present embodiment, the temperature T corresponds to the temperature to which the glass preform 18 or other glass article is heated within the furnace chamber (i.e., the temperature at which the $NH_3$ reacts with the glass preform 18 or other glass article). In this embodiment, the amount of $NH_3$ in the nitridizing gas that decomposes prior to the nitridizing gas reaching the temperature T, is considered to be negligible such that the concentration of $NH_3$ (vol %) in the nitridizing gas at t=0 ($[NH_3]_0$) can be approximated as equal to the concentration of $NH_3$ in the source of the nitridizing gas. The supply of nitridizing gas can continue or be replenished after the contact time $t_c$ for an exposure time to form a nitrogen-doped glass article having the desired level of nitrogen doping. As used herein, unless otherwise specified, exposing an article to a nitridizing gas "within" the contact time $t_c$ means that the glass article is exposed to the nitridizing gas between a time at or equal to the initial time t=0 sec and a time at or equal to the contact time $t_c$. By exposing the glass article to the nitridizing gas within the contact time $t_c$, the decomposed fraction of $NH_3$ is minimized and the efficiency of doping or incorporation of nitrogen into the glass article is improved. In a preferred embodiment, the nitridizing gas is flowing throughout the time interval extending from the initial time t=0 to the contact time $t_c$ or the exposure time. In one embodiment, the contact time $t_c$ corresponds to the residence time described above.

The contact time $t_c$ of the nitridizing gas including $NH_3$ is less than 3.0 seconds, less than 2.75 seconds, less than 2.5 seconds, less than 2.25 seconds, less than 2.0 seconds, less than 1.75 seconds, less than 1.5 seconds, less than 1.0 seconds, less than 0.75 seconds, less than 0.6 seconds, less than 0.5 seconds, less than 0.4 seconds, less than 0.3 seconds, less than 0.2 seconds, or less than 0.1 seconds.

According to one embodiment, a ratio of $[NH_3]_{tc}:[NH_3]_0$ is at least about 0.0001, at least about 0.001, or at least about 0.01. In some aspects, a ratio of $[NH_3]_{tc}:[NH_3]_0$ is from about 0.0001 to 0.1, about 0.0001 to about 0.05, about 0.0001 to about 0.025, about 0.0001 to about 0.01, about 0.0001 to about 0.005, about 0.0001 to about 0.0025, about 0.0001 to about 0.001, about 0.001 to 0.1, about 0.001 to about 0.05, about 0.001 to about 0.025, about 0.001 to about 0.01, about 0.001 to about 0.005, about 0.001 to about 0.0025, about 0.01 to 0.1, about 0.01 to about 0.05, or about 0.01 to about 0.025.

According to one embodiment, a concentration of $NH_3$ gas at the contact time $t_c$ ($[NH_3]_{tc}$) is at least about 0.0005 vol %, at least about 0.005 vol %, or at least about 0.05 vol %. In some aspects, a concentration of $NH_3$ gas at the contact time $t_c$ ($[NH_3]_{tc}$) is from about 0.0005 vol % to about 0.5 vol %, about 0.0005 vol % to about 0.25 vol %, about 0.0005 vol % to about 0.1 vol %, about 0.0005 vol % to about 0.05 vol %, about 0.0005 vol % to about 0.025 vol %, about 0.0005 vol % to about 0.01 vol %, about 0.0005 vol % to about 0.005 vol %, about 0.0005 vol % to about 0.0025 vol %, about 0.0005 vol % to about 0.001 vol %, about 0.005 vol % to about 0.5 vol %, about 0.005 vol % to about 0.25 vol %, about 0.005 vol % to about 0.1 vol %, about 0.005 vol % to about 0.05 vol %, about 0.005 vol % to about 0.025 vol %, about 0.005 vol % to about 0.01 vol %, about 0.05 vol % to about 0.5 vol %, about 0.05 vol % to about 0.25 vol %, or about 0.05 vol % to about 0.1 vol %.

Without wishing to be limited by any theory, it is believed that the thermal decomposition of $NH_3$ over $SiO_2$ follows first order reaction kinetics with respect to $NH_3$. The first order reaction kinetics of $NH_3$ decomposition is discussed in detail in D. A. Cooper and E. B. Ljungstrom, "Decomposition of $NH_3$ over Quartz Sand at 840-960° C.," *Energy & Fuels*, 1988, 2, 716-719, the contents of which are incorporated herein by reference in their entirety. Briefly, it is believed that the decomposition of $NH_3$ can be represented by the following first-order rate expression (V):

$$-d[NH_3]/dt = k*[NH_3] \qquad (V)$$

which upon integration yields formula (VI):

$$-[\ln([NH_3]t/[NH_3]_0)] = k*t \qquad (VI)$$

where $[NH_3]_t$ is a concentration of $NH_3$ in the nitridizing gas at a time t (in seconds), $[NH_3]_0$ is the initial concentration of $NH_3$ in the nitridizing gas, and k represents the first-order rate constant of the reaction, in units of inverse seconds ($s^{-1}$).

The Arrhenius equation (VII) for the rate constant k can be combined with formula (VI) to provide formula (VIII) above in which the time t can be determined as a function of $[NH_3]_t$, $[NH_3]_0$, and temperature.

$$k = Ae^{-Ea/RT} \qquad (VII)$$

$$t = -\left[\ln\left(\frac{[NH_3]_t}{[NH_3]_0}\right)\right] / \left[Ae^{\left(-\frac{Ea}{RT}\right)}\right] \qquad (VIII)$$

where $E_a$ is the activation energy of the decomposition reaction, R is the gas constant, T is the decomposition temperature (in Kelvin), and A is the pre-exponential factor. Based on the work of the above mentioned D. A. Cooper and E. B. Ljungstrom, the activation energy $E_a$ is assumed to be 147 kJ/mol and the pre-exponential factor A is assumed to be $5.12 \times 10^6$ $s^{-1}$. The contact time $t_c$ defined in Eq. (IV) is derived from Eq. (VIII) using these values for $E_a$ and A.

It is understood that formula (IV) can be used to determine any one of the variables $t_c$, $[NH_3]_t$, $[NH_3]_0$, or temperature T based on known or specified values for the remaining variables. For example, based on a desired $[NH_3]_{tc}$ (i.e., a desired concentration of $NH_3$ in the nitridizing gas at the time of contact of the nitridizing gas with the glass article), $[NH_3]_0$, and temperature T, formula (IV) can be used to determine the contact time $t_c$. In another example, formula (IV) can be used to determine an initial $NH_3$ concentration $[NH_3]_0$ based on a desired $[NH_3]_{tc}$, contact time t, and temperature T. In yet another example, formula (IV) can be used to determine a reaction temperature T to which the glass article is heated based on a desired $[NH_3]_t$, $[NH_3]_0$, and contact time $t_c$. Eq. (IV) can accordingly be used to specify times and temperatures for the reaction of $NH_3$ with the glass article consistent with constraints imposed by, for example, the deposition system, deposition technique, glass article etc.

Figure 4:
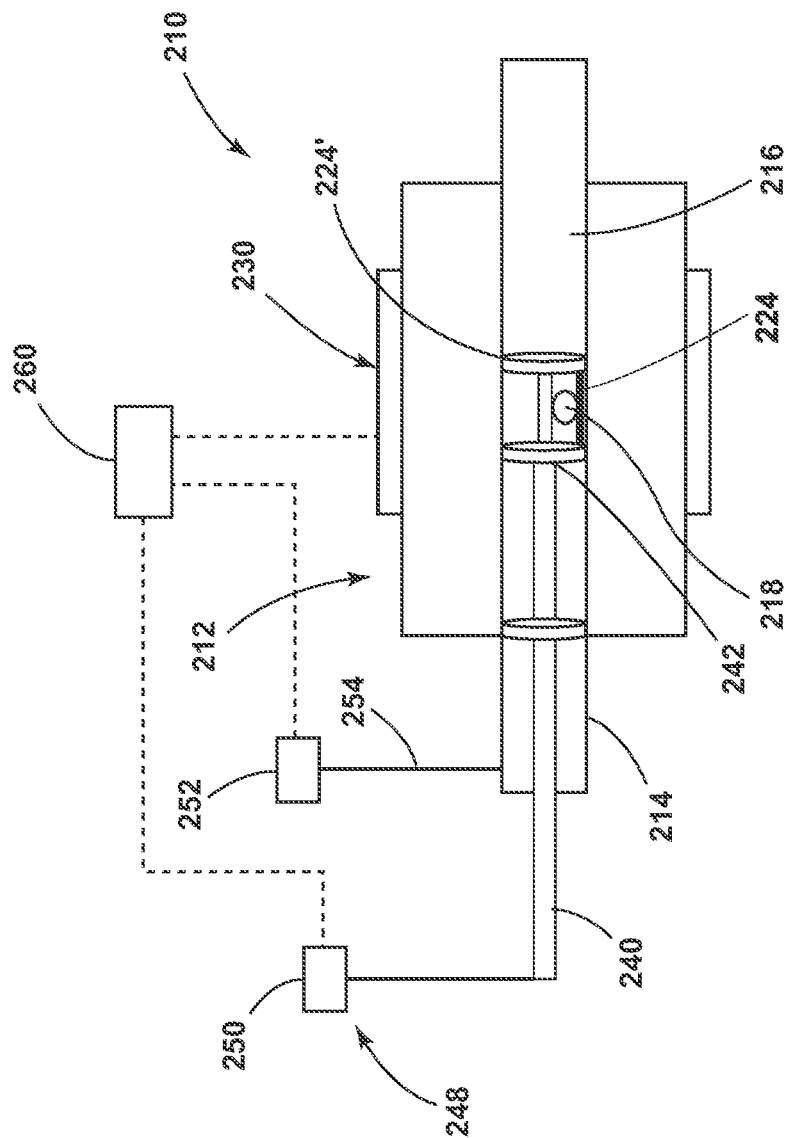
FIG. 4 is a cross-sectional view of a schematic of a nitridizing system for nitrogen doping of a glass article, according to an embodiment of the present disclosure.

FIG. 4 illustrates one example of a nitridizing system 210 that is configured to support a glass article 218 without the use of a preform handle. The nitridizing system 210 is similar to the nitridizing system 10 of FIG. 1, except for some differences, such as the sample cage 224 that supports the glass article 218 for a nitrogen-doping reaction. Therefore, elements of the nitridizing system 210 that are similar to those of the nitridizing system 10 of FIG. 1 are labeled using the same reference numeral increased by the prefix 200. FIG. 4 illustrates one example of how the glass article 218 may be supported within the interior chamber 216 of the furnace assembly 212 during a nitridizing reaction without the use of a preform handle. The glass article may be a glass preform for forming an optical fiber or may be a glass article used for other end applications. The glass article 218 may be supported within the interior chamber 216 in a sample cage 224 made of any suitable material capable of withstanding the reaction conditions within the furnace assembly 212. The gas supply conduit 240 may be coupled with the sample cage 224 through the outlet 242 for supplying the nitridizing gas into an interior of the sample cage 224 through the outlet 242. In the configuration of FIG. 4, a distal end 224' corresponds to the end of the gas supply pathway for the purposes of calculating the residence time of the nitridizing gas and the volumetric flow rate of the nitridizing gas in gas supply conduit 240 corresponds to the volumetric flow rate f used to calculate the residence time of the nitridizing gas. The control unit 260 and various components of the nitridizing system 210 of FIG. 4, such as the gas supply system 248 and the heating system 230 may be controlled in a manner similar to that described above with respect to the control unit 260, gas supply system 248, and heating system 230 of the nitridizing system 10 of FIG. 1, to provide a desired level of nitrogen doping in a glass article.

According to one embodiment, the nitridizing system 10 is configured such that a distance between the outlet of the gas supply pathway and the glass article to be nitrogen doped (e.g., the glass preform 18) is about 10 cm or less. For example, the outlet of the gas supply pathway can be about 10 cm or less, about 8 cm or less, about 6 cm or less, about 5 cm or less, about 3 cm or less, about 2 cm or less, about 1 cm or less, about 0.5 cm or less, about 0.25 cm or less, or about 0.1 cm or less from an adjacent portion of the glass preform 18. In some examples, such as in the configuration of FIG. 1, the outlet of the gas supply pathway is integrally formed with the glass article.

According to one embodiment, the supply of the nitridizing gas at 102 and the heating at 104 can continue for a predetermined period of time to form a nitrogen-doped glass article, such as a nitrogen-doped preform. In one example, the predetermined period of time can correspond to a predetermined level of nitrogen doping in the nitrogen-doped preform. Following formation of the nitrogen-doped preform, the cooling step 106 can be implemented to cool the nitrogen-doped preform to a predetermined temperature. The cooling step 106 can include stopping the supply of the nitridizing gas and stopping the heating (for example, deactivating the heating system 30). In one example, the nitrogen-doped preform can be cooled at step 106 to about ambient temperature (i.e., about 25° C.). In other examples, the nitrogen-doped preform may be cooled to a different temperature, based for example on end-use applications of the preform or additional, subsequent processing steps. Cooling may include actively cooling the nitrogen-doped preform or passive cooling. In one embodiment, the gas supply system 48 can be controlled by the control unit 60 to stop the supply of the nitridizing gas and to supply gaseous $N_2$ (and/or another inert gas, such as gaseous Ar or He) during the cooling at step 106.

According to an embodiment of the present disclosure, at step 108, the nitrogen-doped preform may be treated in one or more additional processing steps. In one example, following the cooling of the nitrogen-doped preform at step 106, the preform can be subjected to a consolidation process that includes a drying process and a sintering process. The drying process can include heating the nitrogen-doped preform and optionally treating the nitrogen-doped preform with a drying agent. The drying process can be implemented to remove water from the nitrogen-doped preform. Part or all of the consolidation process may be conducted in the furnace assembly 12 or the nitrogen-doped preform may be moved to a different furnace assembly for consolidation. In some examples, the drying process can include heating the nitrogen-doped preform to a temperature of from about 800° C. to about 1300° C. for a time period of from about one hour to about five hours. During heating, an inert gas, such as gaseous $N_2$, Ar, and/or He can be supplied to the interior chamber 16. Examples of suitable drying agents that can be used in the drying process include chlorine ($Cl_2$), silicon tetrachloride ($SiCl_4$), thionyl chloride ($SOCl_2$), carbonyl chloride ($COCl_2$), or carbon monoxide (CO).

The dried nitrogen-doped preform can be treated in a sintering process to form a consolidated nitrogen-doped preform. The dried nitrogen-doped preform can be at least partially sintered by heating the preform to a temperature of from about 1200° C. to about 1600° C. An inert gas, such as gaseous He, can be supplied to the interior chamber 16 during sintering. In one example, the dried nitrogen-doped preform is heated to a temperature of about 1490° C.

The consolidated nitrogen-doped preform can be further processed based on the end use application of the nitrogen-doped preform. According to one embodiment, the consolidated nitrogen-doped preform can be directly drawn into an optical fiber. In another embodiment, the consolidated nitrogen-doped preform can be further processed to collapse the channel 70 by heating the preform in a furnace and then drawing the preform into an optical fiber. In one example, collapsing of the channel 70 can include heating the consolidated nitrogen-doped preform to a temperature of from about 1700° C. to about 2200° C. The channel 70 may be at least partially collapsed prior to drawing into an optical fiber. According to some embodiments, the consolidated nitrogen-doped preform can be at least partially collapsed and used as a core cane in an optical fiber. In one example, the nitrogen-doped core cane can be used with an undoped or doped silica cladding to form an optical fiber having a nitrogen-doped core.

EXAMPLES

The following examples describe various features and advantages provided by the disclosure, and are in no way intended to limit the invention and appended claims.

Example 1

Exemplary nitrogen-doped silica glass samples, Examples 1A and 1B, were prepared and the refractive index was measured to evaluate the relationship between nitrogen doping of silica glass and the refractive index of the doped glass. Examples 1A and 1B were both prepared by reacting an OVD silica soot blank with gaseous $NH_3$ to form a nitrogen doped silica glass article using the nitridization system of FIG. 4, as described above. The OVD silica soot blanks for both Examples 1A and 1B (prior to doping) had a density of about 0.7 g/cm$^3$. The samples were annealed and then doped as described above by exposing the silica soot blank to a nitridizing gas flow of 5 vol % $NH_3$ and 95 vol % $N_2$ gas for different reaction times. Example 1A was exposed to the nitridizing gas at a flow rate of about 1 L/min. for about 2.5 hours at a reaction temperature of about 1000° C. Example 1B was exposed to the nitridizing gas at a flow rate of about 1 L/min. for about 5 hours at a reaction temperature of about 1000° C. The reaction temperature corresponds to the temperature of the soot blank at the time of exposure to the nitridizing gas. Following the nitridizing process, both Examples 1A and 1B were consolidated in a consolidation furnace by moving the soot blank through a sinter zone having 6 temperature zones with a temperature transition from about 1000° C. to about 1495° C. at a rate of about 5 mm/min. The refractive index of Example 1A and 1B was determined as a function of nitrogen doping concentration. Nitrogen doping concentration for each sample was determined by elemental analysis.

Figure 5A:
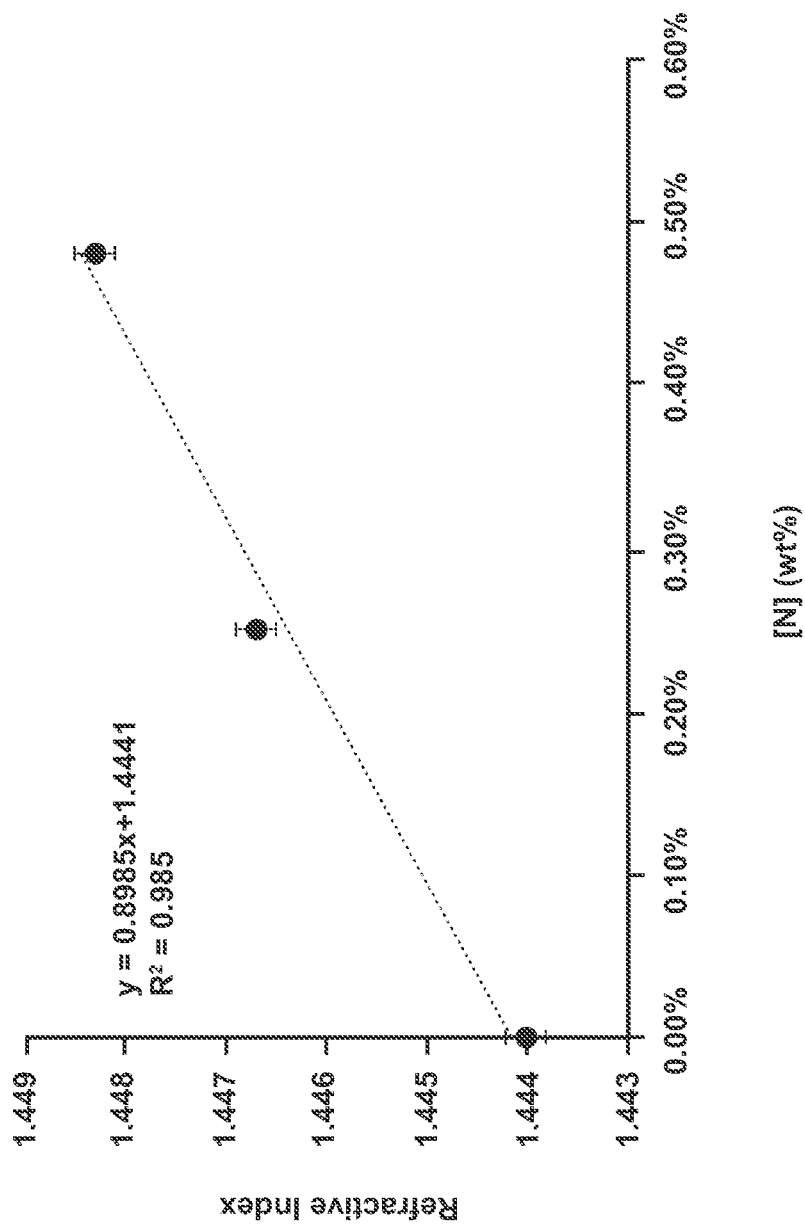
FIG. 5A is a plot of refractive index of a nitrogen-doped silica glass article as a function of nitrogen concentration, according to an embodiment of the present disclosure.
Figure 5B:
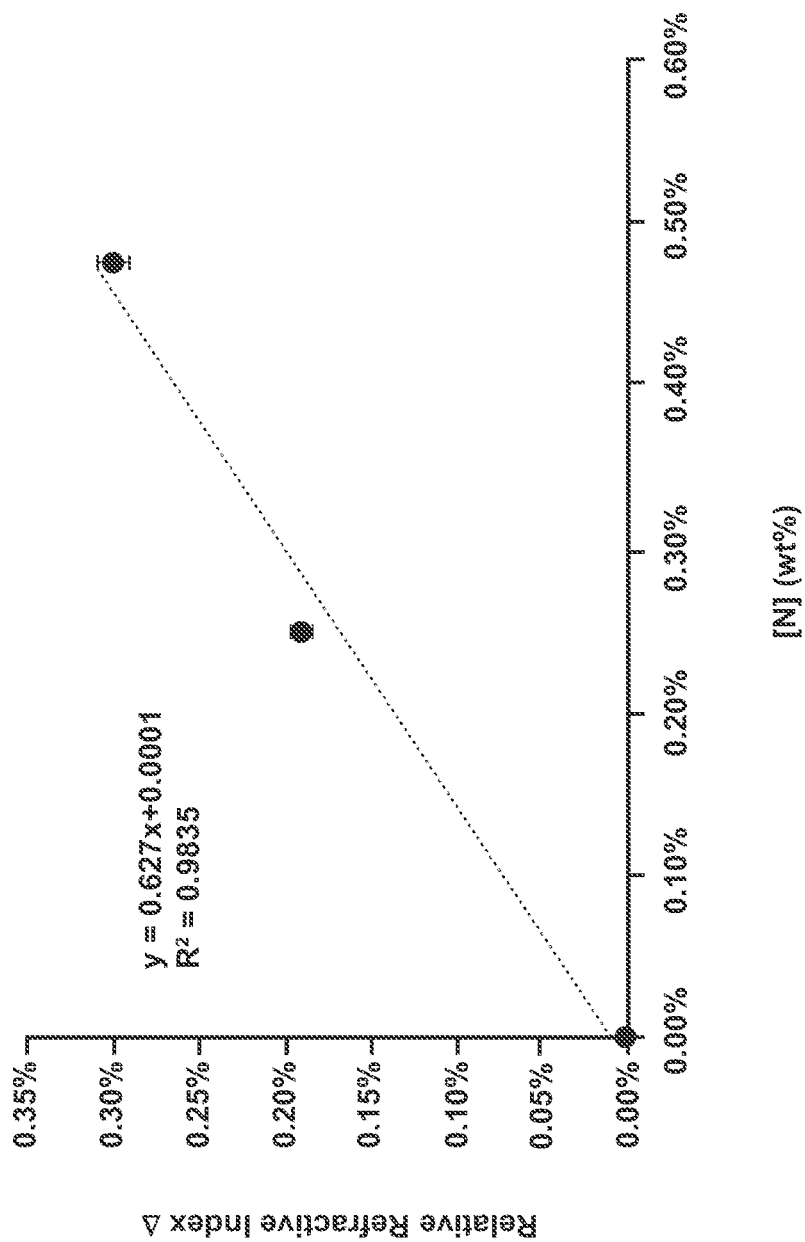
FIG. 5B is a plot of relative refractive index A of a nitrogen-doped silica glass article as a function of nitrogen concentration, according to an embodiment of the present disclosure.

FIGS. 5A and 5B show the refractive index at 1549 nm and relative refractive index $\Delta$ (%) at 1549 nm for Examples 1A and 1B. As demonstrated by the data in FIGS. 5A and 5B, nitrogen dopants can increase the refractive index of silica in a generally linear manner at about 0.0009 per 0.1 wt % of nitrogen concentration. The data in FIGS. 5A and 5B demonstrate that nitrogen can be used to dope silica glass to increase the refractive index of silica glass in a predictable manner.

Example 2

Figure 6:
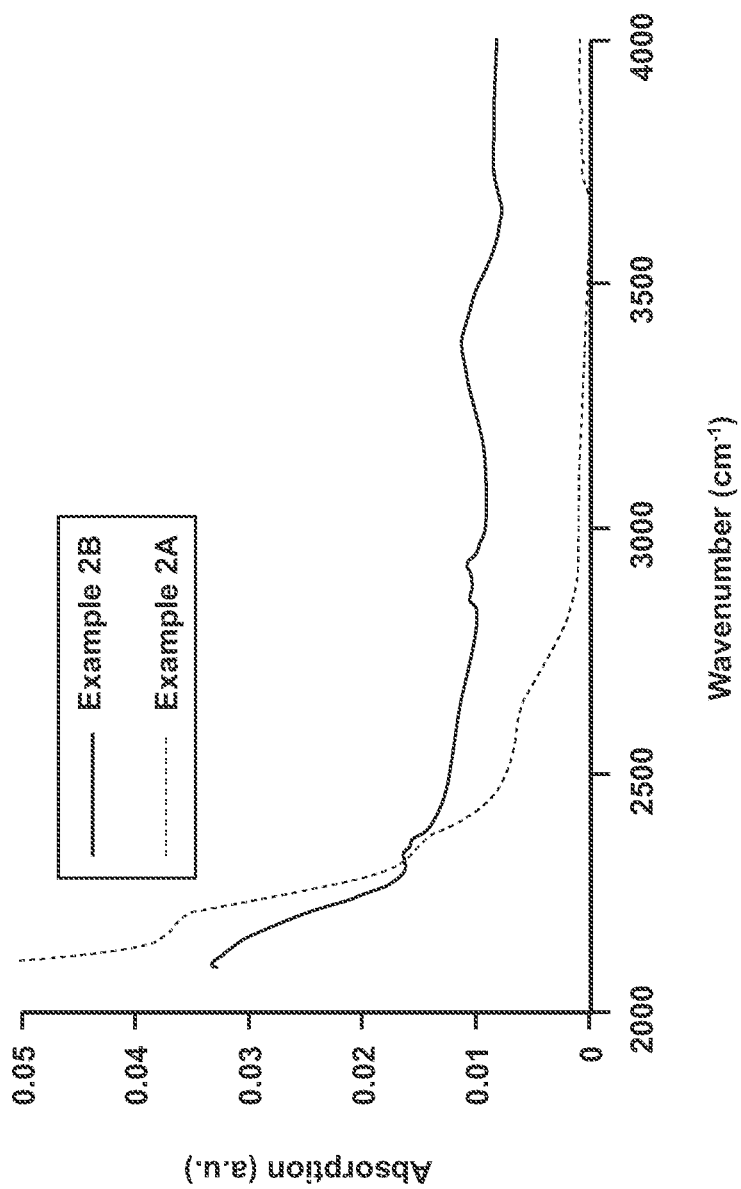
FIG. 6 is a plot of FTIR spectra for nitrogen-doped silica glass articles with and without a drying treatment, according to an embodiment of the present disclosure.

Exemplary nitrogen-doped silica glass samples, Examples 2A and 2B, were prepared in a manner similar to that described above for Example 1A of Example 1, except that Example 2A was also treated in a drying process. The drying process included heating Example 2A at 1250° C. for 60 min. with 5 slpm of a drying gas consisting of 2.4 vol % $Cl_2$/97.6 vol % He. FIG. 6 is a plot of the FTIR spectra for Examples 2A and 2B. The peak in the spectrum of Example 2B around 3400 $cm^{-1}$ is indicative of the presence of NH and/or $NH_2$ species in the sample. Without wishing to be bound by any particular theory, it is believed that NH and/or $NH_2$ species may increase the attenuation of the doped glass, and thus it may be desirable to minimize or remove these species. The spectrum for Example 2A demonstrates that the drying process can decrease the amount of NH and/or $NH_2$ species present in the glass.

Neither Example 2A nor 2B show an absorption band around 3600 $cm^{-1}$ that is typically indicative of the presence of OH species, which may also increase attenuation. Without wishing to bound by any theory, it is believed that the absence of the OH band in the FTIR spectra may be due to (a) a dehydration reaction of $NH_3$ with Si—OH to form water and Si—$NH_2$ species and/or (b) a reaction of Si—OH groups with SiON during consolidation to form $SiO_2$ and SiNH. It is believed that drying with a drying agent, such as $Cl_2$ gas, may directly remove NH and/or $NH_2$ species and/or remove OH groups that can generate NH and/or $NH_2$ species.

Examples 2A and 2B were consolidated in a conventional consolidation process at a temperature of about 1490° C. and the nitrogen dopant content of each sample was determined. Elemental analysis showed that Example 2B (sample without drying) had a nitrogen content of about 0.25 wt %. Example 2A, which was prepared in the same manner as Example 2B, and which was also treated in the drying process, has a nitrogen content of about 0.22 wt %. This data indicates that the majority of nitrogen dopants were retained in the samples, even after being treated in a drying and consolidation process.

Example 3

An exemplary nitrogen-doped article (Example 3A) was made using a system similar to the nitridizing system of FIG. 4. A silica soot blank was made in a conventional OVD process and had a porosity of about 60%, with pores having an average pore diameter of from about 100 nm to about 300 nm. The silica soot blank was about 3.8 cm in diameter and about 2.5 cm in length and had a surface area of about 10-20 $m^2$/g. The silica soot blank was first annealed at a temperature of about 400° C. for 12 hours in a gaseous $N_2$ environment of about 0.2 L/min. The temperature was then ramped up to about 1000° C. at a rate of 5° C./min. The gas flow was switched to a nitridizing gas consisting of 5 vol % $NH_3$ and 95 vol % $N_2$ when the temperature reached about 800° C. The temperature was maintained at 1000° C. for 6 hours during which the silica soot blank reacted with the $NH_3$ in the nitridizing gas to form silicon oxynitride. After 6 hours, the sample was cooled to room temperature at a rate of 5° C./min. and the gas flow was switched to $N_2$ once the temperature reached about 800° C. The nitrogen-doped blank was consolidated in a conventional consolidation process at a temperature of 1490° C.

Elemental analysis of the nitrogen-doped blank prior to consolidation showed a nitrogen content of 0.49% (by weight). Following consolidation, the nitrogen-doped blank exhibited a nitrogen content of 0.48% (by weight). The optical refractive index of the consolidated nitrogen-doped blank is 1.4483 (as measured at 1549 nm). The optical refractive index of pure silica is 1.4441 (as measured at 1549). The increase in optical refractive index of the consolidated nitrogen-doped blank indicates that the nitrogen dopant is incorporated into the $SiO_2$ network of the glass. The relative refractive index change of the nitrogen-doped blank with respect to pure silica was about 0.3%.

Example 4

Table 1 below lists exemplary contact times $t_c$ for Examples 4A-4C ("Ex. 4A-4C") determined using formula (IV) above as a function of temperature T of a nitridizing gas for three different concentrations of $NH_3$ at time $t_c$ ($[NH_3]_{t_c}$). The initial $NH_3$ concentration $[NH_3]_0$ at the initial time t=0 in the nitridizing gas was 5 vol % $NH_3$/95 vol % $N_2$ for all three examples, Ex. 4A-4C. The contact times $t_c$ are given in seconds and the temperature T is given in K (Kelvin) and ° C. All calculations using formula (IV) are based on T in units of K. Ex. 4A corresponds to an example in which the $NH_3$ concentration decreases to 0.01% of its original concentration at time $t_c$. Ex. 4B corresponds to an example in which the $NH_3$ concentration decreases to 0.1% of its original concentration at time $t_c$. Ex. 4C corresponds to an example in which the $NH_3$ concentration decreases to 1% of its original concentration at time $t_c$. For each ratio $[NH_3]_{t_c}/[NH_3]_0$, formula (IV) was simplified to the form shown in Table 1.

The contact time $t_c$ in Table 1 was calculated using formula (IV) above with the assumption that decomposition of $NH_3$ in the nitridizing gas prior to reaching the listed reaction temperature is negligible and thus is not accounted for in the calculation of contact time $t_c$. The data in Table 1 is based on assuming that the process of doping or incorporating nitrogen into a glass article according to an embodiment of the present disclosure can be estimated as follows: (a) a glass article is heated inside a furnace to a predetermined reaction temperature; (b) a nitridizing gas, typically stored at room temperature (i.e., less than 500° C.), is supplied to the furnace; and (c) upon reaching the furnace, a temperature of the nitridizing gas is rapidly increased to the reaction temperature, with the contact time $t_c$ corresponding to the time it takes for the nitridizing gas to reach the glass article. For the purposes of the present calculation, the temperature of the $NH_3$ can be considered to increase to the reaction temperature upon entry into the furnace nearly instantaneously such that the amount of $NH_3$ that decomposes during this time period is negligible and thus can be ignored when calculating contact time $t_c$ according to formula (IV).

TABLE 1

Contact Time $t_c$ of a Nitridizing Gas as a Function of Temperature T of the Nitridizing Gas

| | Ex. 4A | Ex. 4B | Ex. 4C |
|---|---|---|---|
| | | $[NH_3]_{tc}/[NH_3]_0$ | |
| | 0.0001 | 0.001 | 0.01 |
| | | Simplified Formula (IV) | |
| T (° C.)/(K) | $t_c = \dfrac{1.80 \times 10^{-6}}{e^{(-17681/T)}}$ | $t_c = \dfrac{1.35 \times 10^{-6}}{e^{(-17681/T)}}$ | $t_c = \dfrac{9.0 \times 10^{-7}}{e^{(-17681/T)}}$ |
| 600° C./873 K | 1124.21 | 843.16 | 562.10 |
| 700° C./973 K | 140.23 | 105.18 | 70.12 |
| 800° C./1073 K | 25.78 | 19.34 | 12.89 |
| 900° C./1173 K | 6.33 | 4.75 | 3.16 |
| 1000° C./1273 K | 1.94 | 1.45 | 0.97 |
| 1100° C./1373 K | 0.70 | 0.53 | 0.35 |
| 1200° C./1473 K | 0.29 | 0.22 | 0.15 |
| 1300° C./1573 K | 0.14 | 0.10 | 0.07 |
| 1400° C./1673 K | 0.07 | 0.05 | 0.03 |

The exemplary data in Table 1 shows how formula (IV) can be used to determine the contact time $t_c$ that corresponds to a minimum desired concentration of $NH_3$ that reaches the glass article within the contact time $t_c$ during the nitridization process as a function of the temperature of the nitridizing gas.

Table 2 below shows the change in $NH_3$ concentration over time in a nitridizing gas at several temperatures and the corresponding first-order rate constant k of $NH_3$ decomposition at each temperature. The initial $NH_3$ concentration $[NH_3]_0$ in the nitridizing gas was 5 vol % $NH_3$/95 vol % $N_2$. The first-order rate constant k at each temperature was obtained from the D. A. Cooper and E. B. Ljungstrom reference discussed above (using temperature in units of K), and used to calculate the concentration of $NH_3$ as a function of time at each temperature.

TABLE 2

Change in $NH_3$ concentration (vol %) as a Function of Time and Temperature

| Temperature (° C.)/(K) | First-order rate constant k (s$^{-1}$) | Time (s) | $[NH_3]$ (vol %) |
|---|---|---|---|
| 600° C./873 K | 0.008193 | 0 | 5 |
| 600° C./873 K | 0.008193 | 60 | 3.058345 |
| 600° C./873 K | 0.008193 | 120 | 1.870695 |
| 600° C./873 K | 0.008193 | 180 | 1.144246 |
| 600° C./873 K | 0.008193 | 240 | 0.6999 |
| 600° C./873 K | 0.008193 | 3000 | $1.06 \times 10^{-10}$ |
| 700° C./973 K | 0.065678 | 0 | 5 |
| 700° C./973 K | 0.065678 | 10 | 2.592589 |
| 700° C./973 K | 0.065678 | 20 | 1.344303 |
| 700° C./973 K | 0.065678 | 30 | 0.697045 |
| 700° C./973 K | 0.065678 | 40 | 0.36143 |
| 700° C./973 K | 0.065678 | 500 | $2.74 \times 10^{-14}$ |
| 800° C./1073 K | 0.357203 | 0 | 5 |
| 800° C./1073 K | 0.357203 | 2 | 2.447416 |
| 800° C./1073 K | 0.357203 | 4 | 1.197969 |
| 800° C./1073 K | 0.357203 | 6 | 0.586386 |
| 800° C./1073 K | 0.357203 | 8 | 0.287026 |
| 800° C./1073 K | 0.357203 | 100 | $1.53 \times 10^{-15}$ |
| 900° C./1173 K | 1.455474 | 0 | 5 |
| 900° C./1173 K | 1.455474 | 1 | 1.166449 |
| 900° C./1173 K | 1.455474 | 2 | 0.272121 |
| 900° C./1173 K | 1.455474 | 3 | 0.063483 |
| 900° C./1173 K | 1.455474 | 4 | 0.01481 |
| 900° C./1173 K | 1.455474 | 50 | $1.24 \times 10^{-31}$ |
| 1000° C./1273 K | 4.756021 | 0 | 5 |
| 1000° C./1273 K | 4.756021 | 0.3333 | 1.024553 |
| 1000° C./1273 K | 4.756021 | 0.6666 | 0.209942 |
| 1000° C./1273 K | 4.756021 | 0.9999 | 0.043019 |
| 1000° C./1273 K | 4.756021 | 1.3332 | 0.008815 |
| 1000° C./1273 K | 4.756021 | 5 | $2.35 \times 10^{-10}$ |
| 1100° C./1373 K | 13.07903 | 0 | 5 |
| 1100° C./1373 K | 13.07903 | 0.2 | 0.365544 |
| 1100° C./1373 K | 13.07903 | 0.4 | 0.026725 |
| 1100° C./1373 K | 13.07903 | 0.6 | 0.001954 |
| 1100° C./1373 K | 13.07903 | 0.8 | 0.000143 |
| 1100° C./1373 K | 13.07903 | 1 | $1.04 \times 10^{-5}$ |
| 1200° C./1473 K | 31.3514 | 0 | 5 |
| 1200° C./1473 K | 31.3514 | 0.1 | 0.21747 |
| 1200° C./1473 K | 31.3514 | 0.2 | 0.009459 |
| 1200° C./1473 K | 31.3514 | 0.3 | 0.000411 |
| 1200° C./1473 K | 31.3514 | 0.4 | $1.79 \times 10^{-5}$ |
| 1200° C./1473 K | 31.3514 | 0.5 | $7.78 \times 10^{-7}$ |

The following non-limiting aspects are encompassed by the present disclosure. To the extent not already described, any one of the features of the first through the forty-third aspect may be combined in part or in whole with features of any one or more of the other aspects of the present disclosure to form additional aspects, even if such a combination is not explicitly described.

According to a first aspect of the present disclosure, a method of nitridizing a glass article, includes: heating a glass article to a first temperature in a heating chamber; supplying a nitridizing gas including $NH_3$ to the heating chamber, wherein the nitridizing gas has an initial concentration of $NH_3$ ($[NH_3]_0$); heating the nitridizing gas to the first temperature at a first time; exposing the glass article to the nitridizing gas within a contact time ($t_a$) of the first time according to formula (IV):

$$t_c = -\left[\ln\left(\frac{[NH_3]_{t_c}}{[NH_3]_0}\right)\right] / [(5.12 \times 10^6)e^{(-17681/T)}] \quad (IV)$$

where $[NH_3]_{t_c}$ is a concentration of $NH_3$ in the nitridizing gas at time $t_c$, $[NH_3]_0$ is a concentration of $NH_3$ at the first time, $t_c$ is in seconds, and T is the first temperature (in Kelvin), and wherein a ratio of $[NH_3]_{tc}:[NH_3]_0$ is at least about 0.0001.

According to a second aspect of the present disclosure, the method of aspect 1, wherein a ratio of $[NH_3]_{tc}:[NH_3]_0$ is from about 0.0001 to about 0.1.

According to a third aspect of the present disclosure, the method of aspect 1, wherein a concentration of $NH_3$ in the nitridizing gas at time $t_c$ ($[NH_3]_{tc}$) is at least about 0.0005 vol %.

According to a fourth aspect of the present disclosure, the method of any one of aspects 1-3, wherein the first temperature is in a range of from about 600° C. to about 1400° C.

According to a fifth aspect of the present disclosure, the method of any one of aspects 1-3, wherein the first temperature is in a range of from about 800° C. to about 1200° C.

According to a sixth aspect of the present disclosure, the method of any one of aspects 1-5, wherein the glass article is porous.

According to a seventh aspect of the present disclosure, the method of any one of aspects 1-6, wherein the glass article has a density of from about 0.3 g/cm$^3$ to about 1.8 g/cm$^3$.

According to an eighth aspect of the present disclosure, the method of any one of aspects 1-7, wherein the nitridizing gas further includes an inert carrier gas, and wherein a concentration of gaseous $NH_3$ ($NH_3/(NH_3$+carrier gas)) is from about 3 vol % to about 100 vol %.

According to a ninth aspect of the present disclosure, the method of any one of aspects 1-8, wherein the nitridizing gas further includes an inert carrier gas, and wherein a concentration of gaseous $NH_3$ ($NH_3/(NH_3$+carrier gas)) is from about 3 vol % to about 10 vol %.

According to a tenth aspect of the present disclosure, the method of any one of aspects 1-9, wherein the glass article is an optical fiber preform including an open channel, and wherein the supplying a nitridizing gas includes supplying the nitridizing gas into the open channel.

According to an eleventh aspect of the present disclosure, the method of any one of aspects 1-10, wherein after the predetermined treatment period the method further includes: cooling the nitrogen-doped glass article to a second temperature that is less than the first temperature in an inert gas environment.

According to a twelfth aspect of the present disclosure, the method of any one of aspects 1-11, wherein after the predetermined treatment period the method further includes: consolidating the nitrogen-doped glass article by heating the nitrogen-doped glass article to a temperature of from about 1200° C. to about 1600° C. to form a consolidated nitrogen-doped glass article.

According to a thirteenth aspect of the present disclosure, the method of aspect 12, wherein the nitrogen-doped glass article is treated with a gaseous agent selected from $Cl_2$, $SiCl_4$, $F_2$, $CF_4$, CO, and mixtures thereof prior to the consolidating.

According to a fourteenth aspect of the present disclosure, the method of any one of aspects 1-13, wherein the glass article includes one of undoped silica glass or doped silica glass.

According to a fifteenth aspect of the present disclosure, the method of any one of aspects 1-14, wherein the supplying a nitridizing gas includes supplying the nitridizing gas at a volumetric flow rate f of from about 1 L/min. to about 2.5 L/min.

According to a sixteenth aspect of the present disclosure, a method of doping a glass article with nitrogen, including: supplying a nitridizing gas to a glass article through an outlet of a gas supply conduit, wherein the nitridizing gas includes gaseous $NH_3$, and wherein a distance between the outlet and the glass article is less than or equal to about 10 cm; heating the glass article in a furnace to a first temperature in the presence of the nitridizing gas to form a nitrogen-doped glass article, and wherein a residence time of the nitridizing gas is <3.0 seconds, and wherein the residence time is defined by formula (III):

$$V_t/f \quad \text{(III)}$$

where $V_t$ is an interior volume of the gas supply conduit between a position at which a temperature of the nitridizing gas is >500° C. and the outlet, and where f is the volumetric flow rate of the nitridizing gas in the gas supply conduit.

According to a seventeenth aspect of the present disclosure, the method of aspect 16, wherein the residence time of the nitridizing gas is <2.0 seconds.

According to an eighteenth aspect of the present disclosure, the method of aspect 16 or aspect 17, further including: prior to the supplying a nitridizing gas mixture, heating the glass article to a temperature of at least 400° C. for a predetermined period of time.

According to a nineteenth aspect of the present disclosure, the method of any one of aspects 16-18, wherein the first temperature is from about 600° C. to about 1300° C.

According to a twentieth aspect of the present disclosure, the method of any one of aspects 16-18, wherein the heating the glass article in a furnace to a first temperature includes heating the glass article to a temperature of from about 900° C. to about 1300° C.

According to a twenty-first aspect of the present disclosure, the method of any one of aspects 16-20, wherein the glass article has a density of from about 0.3 g/cm$^3$ to about 1.8 g/cm$^3$.

According to a twenty-second aspect of the present disclosure, the method of any one of aspects 16-21, wherein the nitridizing gas further includes an inert carrier gas, and wherein a concentration of gaseous $NH_3$ ($NH_3/(NH_3$+carrier gas)) is from about 3 vol % to about 100 vol %.

According to a twenty-third aspect of the present disclosure, the method of any one of aspects 16-21, wherein the nitridizing gas further includes an inert carrier gas, and wherein a concentration of gaseous $NH_3$ ($NH_3/(NH_3$+carrier gas)) is from about 3 vol % to about 10 vol %.

According to a twenty-fourth aspect of the present disclosure, the method of any one of aspects 16-23, wherein the glass article is an optical fiber preform including an open channel, and wherein the supplying a nitridizing gas includes supplying the nitridizing gas into the open channel.

According to a twenty-fifth aspect of the present disclosure, the method of any one of aspects 16-24, wherein subsequent to the heating the glass article in a furnace, the method further includes: cooling the nitrogen-doped glass article to a second temperature that is less than the first temperature in an inert gas environment.

According to a twenty-sixth aspect of the present disclosure, the method of any one of aspects 16-25, wherein subsequent to the heating the glass article in a furnace, the method further includes: consolidating the nitrogen-doped glass article by heating the nitrogen-doped glass article to a temperature of from about 1200° C. to about 1600° C. to form a consolidated nitrogen-doped glass article.

According to a twenty-seventh aspect of the present disclosure, the method of aspect 26, wherein the nitrogen-doped glass article is treated with a gaseous agent selected from $Cl_2$, $SiCl_4$, $F_2$, $CF_4$, CO, and mixtures thereof prior to the consolidating.

According to a twenty-eighth aspect of the present disclosure, the method of any one of aspects 16-27, wherein the glass article includes one of undoped silica glass or doped silica glass.

According to a twenty-ninth aspect of the present disclosure, the method of any one of aspects 16-28, wherein the volumetric flow rate f of the nitridizing gas is from about 1 L/min. to about 2.5 L/min.

According to a thirtieth aspect of the present disclosure, a method of doping a glass preform with nitrogen, including: disposing a glass preform having a first end and a second end in a furnace assembly, wherein the glass preform includes an open channel extending from the first end at least partially through a body of the glass preform toward the second end; supplying a nitridizing gas to the open channel of the glass preform through a gas supply pathway having an outlet aligned with an inlet to the open channel, wherein the nitridizing gas includes gaseous $NH_3$; heating the glass preform to a first temperature in the presence of the nitridizing gas to form a nitrogen-doped glass preform; and wherein a residence time of the nitridizing gas is <3.0 seconds, and wherein the residence time is defined by formula (III):

$$V_t/f \qquad (III)$$

where $V_t$ is an interior volume of the gas supply pathway between a position at which a temperature of the nitridizing gas is >500° C. and an end of the open channel, and where f is the volumetric flow rate of the nitridizing gas in the gas supply pathway.

According to a thirty-first aspect of the present disclosure, the method of aspect 30, wherein the glass preform is supported within the furnace assembly by a preform handle having an open channel that is fluidly coupled with the open channel of the glass preform, and wherein the gas supply pathway includes a gas supply conduit fluidly coupled at a first end with a source of the nitridizing gas and fluidly coupled at a second end with an inlet to the open channel of the preform handle.

According to a thirty-second aspect of the present disclosure, the method of aspect 30 or aspect 31, wherein the residence time of the nitridizing gas mixture is <2.0 seconds.

According to a thirty-third aspect of the present disclosure, the method of any one of aspects 30-32, further including: prior to the supplying a nitridizing gas mixture, heating the glass preform to a temperature of at least 400° C.

According to a thirty-fourth aspect of the present disclosure, the method of any one of aspects 30-33, wherein first temperature includes a temperature of from about 600° C. to about 1300° C.

According to a thirty-fifth aspect of the present disclosure, the method of any one of aspects 30-34, wherein the heating the glass preform to a first temperature includes heating the glass preform to a temperature of from about 900° C. to about 1300° C.

According to a thirty-sixth aspect of the present disclosure, the method of any one of aspects 30-35, wherein the glass preform has a density of from about 0.3 g/cm³ to about 1.8 g/cm³.

According to a thirty-seventh aspect of the present disclosure, the method of any one of aspects 30-36, wherein the nitridizing gas further includes an inert carrier gas, and wherein a concentration of gaseous $NH_3$ ($NH_3$/($NH_3$+carrier gas)) is from about 3 vol % to about 100 vol %.

According to a thirty-eighth aspect of the present disclosure, the method of any one of aspects 30-36, wherein the nitridizing gas further includes gaseous $N_2$, and wherein a concentration of gaseous $NH_3$ ($NH_3$/($NH_3$+carrier gas)) is from about 3 vol % to about 10 vol %.

According to a thirty-ninth aspect of the present disclosure, the method of any one of aspects 30-38, wherein subsequent to the heating the glass preform, the method further includes: cooling the nitrogen-doped glass preform to a second temperature, lower than the first temperature, in an inert gas environment.

According to a fortieth aspect of the present disclosure, the method of any one of aspects 30-39, wherein subsequent to the heating the glass preform, the method further includes: consolidating the nitrogen-doped glass preform by heating the nitrogen-doped glass preform to a temperature of from about 1200° C. to about 1600° C. to form a consolidated nitrogen-doped glass preform.

According to a forty-first aspect of the present disclosure, the method of aspect 40, wherein the nitrogen-doped glass preform can be treated with a gaseous agent selected from $Cl_2$, $SiCl_4$, $F_2$, $CF_4$, CO, and mixtures thereof prior to the consolidating.

According to a forty-second aspect of the present disclosure, the method of any one of aspects 30-41, wherein the glass preform includes one of undoped silica glass or doped silica glass.

According to a forty-third aspect of the present disclosure, the method of any one of aspects 30-42, wherein the flow rate f of the nitridizing gas mixture is from about 1 L/min. to about 2.5 L/min.

Many variations and modifications may be made to the above-described embodiments of the disclosure without departing substantially from the spirit and various principles of the disclosure. All such modifications and variations are intended to be included herein within the scope of this disclosure and protected by the following claims. It will be understood that any described processes or steps within described processes may be combined with other disclosed processes or steps to form structures within the scope of the present disclosure. The exemplary structures and processes disclosed herein are for illustrative purposes and are not to be construed as limiting.

To the extent not already described, the different features of the various aspects of the present disclosure may be used in combination with each other as desired. That a particular feature is not explicitly illustrated or described with respect to each aspect of the present disclosure is not meant to be construed that it cannot be, but it is done for the sake of brevity and conciseness of the description. Thus, the various features of the different aspects may be mixed and matched as desired to form new aspects, whether or not the new aspects are expressly disclosed.

What is claimed is:

1. A method of nitridizing a glass article, comprising:
   heating a glass article to a first temperature in a heating chamber;
   supplying a nitridizing gas comprising $NH_3$ to the heating chamber, wherein the nitridizing gas has an initial concentration of $NH_3$ ($[NH_3]_0$);
   heating the nitridizing gas to the first temperature at a first time;
   exposing the glass article to the nitridizing gas within a contact time ($t_c$) of the first time according to formula (IV):

$$t_c = -\left[\ln\left(\frac{[NH_3]_{t_c}}{[NH_3]_0}\right)\right] / [(5.12 \times 10^6)e^{(-17681/T)}] \quad \text{(IV)}$$

where $[NH_3]_{t_c}$ is a concentration of $NH_3$ in the nitridizing gas at time $t_c$, $[NH_3]_0$ is a concentration of $NH_3$ at the first time, $t_c$ is in seconds, and T is the first temperature (in Kelvin), and wherein a ratio of $[NH_3]_{t_c}:[NH_3]_0$ is at least about 0.0001.

2. The method of claim 1, wherein a ratio of $[NH_3]_{t_c}:[NH_3]_0$ is from about 0.0001 to about 0.1.

3. The method of claim 1, wherein a concentration of $NH_3$ in the nitridizing gas at time $t_c$ ($[NH_3]_{t_c}$) is at least about 0.0005 vol %.

4. The method of claim 1, wherein the first temperature is in a range of from about 600° C. to about 1400° C.

5. The method of claim 1, wherein the glass article has a density of from about 0.3 g/cm$^3$ to about 1.8 g/cm$^3$.

6. The method of claim 1, wherein the nitridizing gas further comprises an inert carrier gas, and wherein a concentration of gaseous $NH_3$ ($NH_3$/($NH_3$+carrier gas)) is from about 3 vol % to about 100 vol %.

7. The method of claim 1, wherein after the predetermined treatment period the method further comprises:
consolidating the nitrogen-doped glass article by heating the nitrogen-doped glass article to a temperature of from about 1200° C. to about 1600° C. to form a consolidated nitrogen-doped glass article.

8. A method of doping a glass article with nitrogen, comprising:
supplying a nitridizing gas to a glass article through an outlet of a gas supply conduit, wherein the nitridizing gas comprises gaseous $NH_3$, and wherein a distance between the outlet and the glass article is less than or equal to about 10 cm;
heating the glass article in a furnace to a first temperature in the presence of the nitridizing gas to form a nitrogen-doped glass article, and
wherein a residence time of the nitridizing gas is <3.0 seconds, and wherein the residence time is defined by formula (III):

$$V_t / f \quad \text{(III)}$$

where $V_t$ is an interior volume of the gas supply conduit between a position at which a temperature of the nitridizing gas is >500° C. and the outlet, and where f is the volumetric flow rate of the nitridizing gas in the gas supply conduit.

9. The method of claim 8, wherein the first temperature is from about 600° C. to about 1300° C.

10. The method of claim 8, wherein the glass article has a density of from about 0.3 g/cm$^3$ to about 1.8 g/cm$^3$.

11. The method of claim 8, wherein the nitridizing gas further comprises an inert carrier gas, and wherein a concentration of gaseous $NH_3$ ($NH_3$/($NH_3$+carrier gas)) is from about 3 vol % to about 100 vol %.

12. The method of claim 8, wherein subsequent to the heating the glass article in a furnace, the method further comprises:
consolidating the nitrogen-doped glass article by heating the nitrogen-doped glass article to a temperature of from about 1200° C. to about 1600° C. to form a consolidated nitrogen-doped glass article.

13. The method of claim 8, wherein the volumetric flow rate f of the nitridizing gas is from about 1 L/min. to about 2.5 L/min.

14. A method of doping a glass preform with nitrogen, comprising:
disposing a glass preform having a first end and a second end in a furnace assembly, wherein the glass preform includes an open channel extending from the first end at least partially through a body of the glass preform toward the second end;
supplying a nitridizing gas to the open channel of the glass preform through a gas supply pathway having an outlet aligned with an inlet to the open channel, wherein the nitridizing gas comprises gaseous $NH_3$;
heating the glass preform to a first temperature in the presence of the nitridizing gas to form a nitrogen-doped glass preform; and
wherein a residence time of the nitridizing gas is <3.0 seconds, and wherein the residence time is defined by formula (III):

$$V_t / f \quad \text{(III)}$$

where $V_t$ is an interior volume of the gas supply pathway between a position at which a temperature of the nitridizing gas is >500° C. and an end of the open channel, and where f is the volumetric flow rate of the nitridizing gas in the gas supply pathway.

15. The method of claim 14, wherein the glass preform is supported within the furnace assembly by a preform handle having an open channel that is fluidly coupled with the open channel of the glass preform, and wherein the gas supply pathway includes a gas supply conduit fluidly coupled at a first end with a source of the nitridizing gas and fluidly coupled at a second end with an inlet to the open channel of the preform handle.

16. The method of claim 14, wherein the first temperature comprises a temperature of from about 600° C. to about 1300° C.

17. The method of claim 14, wherein the glass preform has a density of from about 0.3 g/cm$^3$ to about 1.8 g/cm$^3$.

18. The method of claim 14, wherein the nitridizing gas further comprises an inert carrier gas, and wherein a concentration of gaseous $NH_3$ ($NH_3$/($NH_3$+carrier gas)) is from about 3 vol % to about 100 vol %.

19. The method of claim 14, wherein subsequent to the heating the glass preform, the method further comprises:
consolidating the nitrogen-doped glass preform by heating the nitrogen-doped glass preform to a temperature of from about 1200° C. to about 1600° C. to form a consolidated nitrogen-doped glass preform.

20. The method of claim 14, wherein the flow rate f of the nitridizing gas mixture is from about 1 L/min. to about 2.5 L/min.

* * * * *